(12) United States Patent
Kobayashi

(10) Patent No.: US 8,639,641 B2
(45) Date of Patent: Jan. 28, 2014

(54) INFORMATION PROCESSING DEVICE, INFORMATION PROCESSING METHOD, AND PROGRAM

(75) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 189 days.

(21) Appl. No.: 13/176,552

(22) Filed: Jul. 5, 2011

(65) Prior Publication Data

US 2012/0016821 A1      Jan. 19, 2012

(30) Foreign Application Priority Data

Jul. 14, 2010   (JP) ............................... P2010-159598

(51) Int. Cl.
*G06F 15/18*      (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| | | | | |
|---|---|---|---|---|
| 2003/0182310 A1* | 9/2003 | Charnock et al. | .......... | 707/104.1 |
| 2004/0172374 A1* | 9/2004 | Forman | ............................ | 706/12 |
| 2006/0133666 A1* | 6/2006 | Liu et al. | ....................... | 382/159 |
| 2010/0145678 A1* | 6/2010 | Csomai et al. | .................... | 704/9 |

FOREIGN PATENT DOCUMENTS

JP       2009-048266      3/2009

OTHER PUBLICATIONS

Ahmed Abbasi, Hsinchun Chen, and Arab Salem. 2008. Sentiment analysis in multiple languages: Feature selection for opinion classification in Web forums. ACM Trans. Inf. Syst. 26, 3, Article 12 (Jun. 2008), 34 pages.*

* cited by examiner

*Primary Examiner* — Jeffrey A. Gaffin
*Assistant Examiner* — David H Kim
(74) *Attorney, Agent, or Firm* — Finnegan, Henderson, Farabow, Garrett & Dunner, L.L.P.

(57) ABSTRACT

There is provided a method including inputting a plurality of symbol strings and attribute information desired to be extracted from each symbol string; selecting a plurality of functions from a predetermined function group including a function for converting a symbol string into a numerical value, and generating a plurality of feature quantity functions for outputting a feature quantity from the symbol string by combining the plurality of functions; inputting each symbol string to each feature quantity function, and calculating a feature quantity corresponding to each symbol string; executing machine learning using the attribute information corresponding to each symbol string and the feature quantity corresponding to each symbol string, and generating an estimation function for estimating the attribute information from the feature quantity; and outputting the feature quantity functions and the estimation function.

7 Claims, 19 Drawing Sheets

FIG.4

(Learning data: symbol string = "character string," attribute information = "opinion")

| Symbol string X | Attribute information t |
|---|---|
| We should have done it earlier? | 1 |
| The weather is nice today. | 0 |
| I really liked the atmosphere. | 1 |
| "Apple" in English. | 0 |
| The stock price of ○○ has suddenly risen. | 0 |
| ○○ is great!! | 1 |
| ⋮ | ⋮ |
| A thorough investigation of the new Japanese product ○○ was released today | 0 |

YES → t = 1
NO → t = 0

FIG.5

(N-gram appearance frequency)

| N-gram | Appearance frequency |
|---|---|
| ○○ | 3 |
| a | 3 |
| b | 3 |
| ab | 3 |
| bc | 2 |
| c | 2 |
| d | 2 |
| e | 2 |
| ⋮ | ⋮ | bi-gram
uni-gram

FIG.6

(Calculation results of feature quantity functions $FEF_1$ to $FEF_N$: feature quantities $x_1$ to $xN_N$)

| Symbol string X | $x_1 = FEF_1(X)$ | ... | $x_N = FEF_N(X)$ |
|---|---|---|---|
| We should have done it earlier? | 0 | ... | 1 |
| The weather is nice today. | 0 | ... | 1 |
| I really liked the atmosphere. | 0 | ... | 1 |
| "Apple" in English. | 1 | ... | 0 |
| The stock price of ○○ has suddenly risen. | 1 | ... | 0 |
| ○○ is great!! | ... | ... | ... |
| A thorough investigation of the new Japanese product ○○ was released today | 0 | ... | 0 | ex.) $FEF_1(X)$ = Appearance( Cut(x, 0.0, 0.3), "○○" )

...

$FEF_N(X)$ = Appearance (X, " ○ ")

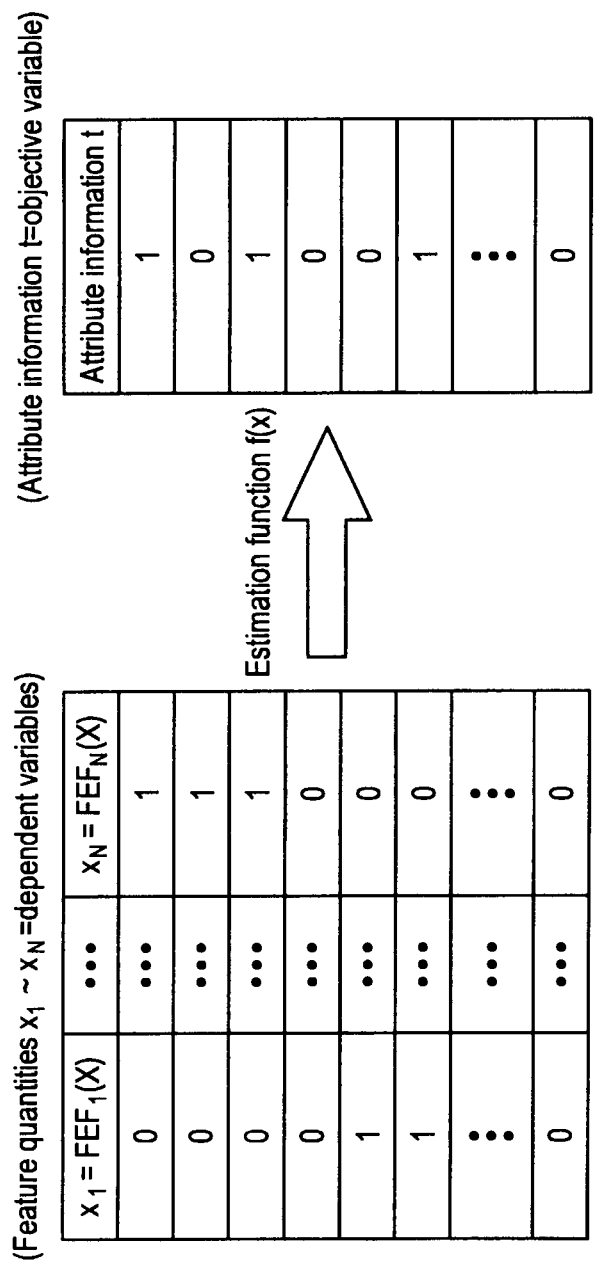

FIG.8

(Selection of effective feature quantity function FEF)

| Feature quantity function FEF | Selection |
|---|---|
| Appearance( Cut(X, 0.0, 0.3) "∘∘" ) | YES |
| Appearance (X, "∘" ) | YES |
| Pow( Median( Find( Cut( X, 0.1, 0.3), "B" ) ), 2) | NO |
| Variance( Find( X, "Foo" ) ) | NO |
| ⋮ | ⋮ |
| Pow( Median( Find( Cut( X, 0.1, 0.3), "A" ) ), 2) | NO |

(Generation of feature quantity function FEF: S103)

(Random generation of feature quantity function list: S122)

(Random generation of feature quantity function: S132, S192)

*Example of termination conditions*
1: Whether it has reached number of randomly decided fundamental functions
2: Whether generated random number is equal to or less than predetermined value (Evolutionary generation of feature quantity function list: S123)

(Selection: S152)

INFORMATION PROCESSING DEVICE, INFORMATION PROCESSING METHOD, AND PROGRAM

BACKGROUND

The present disclosure relates to an information processing device, an information processing method, and a program.

Recently, attention has been focused on a technique of mechanically extracting a feature quantity of a data group from any data group in which a feature is difficult to decide quantitatively. For example, a technique of automatically constructing an algorithm of receiving any music data and mechanically extracting a music genre to which the music data belongs has been known. Music genres such as jazz, classical, and pop are not quantitatively decided according to a type of musical instrument or a performance type. Thus, in general, it has previously been considered difficult to extract a music genre from music data when any music data is given.

However, actually, a feature of dividing music genres is potentially included in various information combinations such as a combination of musical intervals included in music data, a musical-interval combination method, a combination of types of musical instruments, and a structure of a melody line or a base line. Thus, a feature quantity extractor has been studied from a point of view of whether an algorithm of extracting the feature (hereinafter referred to as the feature quantity extractor) can be automatically constructed by machine learning. As one study result, for example, an automatic construction method of the feature quantity extractor based on a genetic algorithm is disclosed in Japanese Patent Application Laid-Open No. 2009-048266. The genetic algorithm considers selection, crossover, and mutation elements in a machine learning process following a biological evolution process.

It is possible to automatically construct the feature quantity extractor for extracting a music genre to which music data belongs from any music data using the algorithm of automatically constructing the feature quantity extractor disclosed in Japanese Patent Application Laid-Open No. 2009-048266. The algorithm of automatically constructing the feature quantity extractor disclosed in Japanese Patent Application Laid-Open No. 2009-048266 has very high versatility and is not limited to the music data, and can automatically construct the feature quantity extractor, which extracts a feature quantity of a data group from any data group. Thus, the algorithm of automatically constructing the feature quantity extractor disclosed in Japanese Patent Application Laid-Open No. 2009-048266 is expected to be applied to feature quantity analysis of artificial data such as music data or video data, feature quantity analysis of various observation quantities in nature, or the like.

SUMMARY

At present, there is demand for automatically constructing a language analysis algorithm using the algorithm of automatically constructing the feature quantity extractor described above. The language analysis algorithm is an algorithm of analyzing an input character string and estimating attribute information expressing a feature of the character string. Because the language analysis algorithm of the related art is manually constructed, a large amount of time and cost is taken for its development. Further, special knowledge for language processing is necessary to construct the language analysis algorithm, and manpower capable of constructing the language analysis algorithm is limited. Because the language analysis technology of the related art is an application of morphological analysis technology or feature quantity extraction technology using a dictionary, the language analysis algorithm of the related art relies on a type of language.

It is desirable to provide a novel and improved information processing device, information processing method, and program that can automatically construct a language analysis algorithm without relying on a type of language. Further, it is desirable to provide an information processing device, an information processing method, and a program that can automatically construct an analysis algorithm of receiving any symbol string and estimating attribute information expressing a feature of the symbol string.

According to an embodiment of the present disclosure, there is provided an information processing device which includes an input section for inputting a plurality of symbol strings and attribute information desired to be extracted from each symbol string; a feature quantity function generation section for selecting a plurality of functions from a predetermined function group including a function for converting a symbol string into a numerical value, and generating a plurality of feature quantity functions for outputting a feature quantity from the symbol string by combining the plurality of functions; a feature quantity calculation section for inputting each symbol string input by the input section to each feature quantity function generated by the feature quantity function generation section and calculating a feature quantity corresponding to each symbol string; an estimation function generation section for executing machine learning using the attribute information corresponding to each symbol string input by the input section and the feature quantity corresponding to each symbol string calculated by the feature quantity calculation section, and generating an estimation function for estimating the attribute information from the feature quantity; and an output section for outputting the feature quantity functions generated by the feature quantity function generation section and the estimation function generated by the estimation function generation section.

The symbol string may be a character string.

The estimation function generation section may include an effective feature quantity selection section for selecting a feature quantity effective to estimate the attribute information; and a machine learning section for executing machine learning using the effective feature quantity selected by the effective feature quantity selection section and attribute information corresponding to the effective feature quantity, and generating an estimation function for estimating the attribute information from the effective feature quantity.

The information processing device may further include a generation alternation section for generating a next-generation feature quantity function by assuming the feature quantity function to be an entity and executing entity selection, inter-entity crossover, and entity mutation. If the next-generation feature quantity function has been generated by the generation alternation section, the feature quantity calculation section may calculate a feature quantity using the next-generation feature quantity function, and the estimation function generation section may generate an estimation function using the feature quantity calculated using the next-generation feature quantity function by the feature quantity calculation section. The generation of the next-generation feature quantity function by the generation alternation section, the calculation of the feature quantity by the feature quantity calculation section, and the generation of the estimation function by the estimation function generation section may be iteratively executed.

The information processing device may further include an N-gram analysis section for executing N-gram analysis for a symbol string input by the input section, and measuring appearance frequencies of N-grams appearing in the symbol string. The feature quantity function generation section may generate the feature quantity function using the N-grams obtained by the analysis by the N-gram analysis section and the N-gram appearance frequencies.

According to another embodiment of the present disclosure, there is provided an information processing method which includes inputting a plurality of symbol strings and attribute information desired to be extracted from each symbol string; selecting a plurality of functions from a predetermined function group including a function for converting a symbol string into a numerical value, and generating a plurality of feature quantity functions for outputting a feature quantity from the symbol string by combining the plurality of functions; inputting each symbol string to each feature quantity function, and calculating a feature quantity corresponding to each symbol string; executing machine learning using the attribute information corresponding to each symbol string and the feature quantity corresponding to each symbol string, and generating an estimation function for estimating the attribute information from the feature quantity; and outputting the feature quantity functions and the estimation function.

According to another embodiment of the present disclosure, there is provided a program for causing a computer to implement an input function of inputting a plurality of symbol strings and attribute information desired to be extracted from each symbol string; a feature quantity function generation function of selecting a plurality of functions from a predetermined function group including a function for converting a symbol string into a numerical value, and generating a plurality of feature quantity functions for outputting a feature quantity from the symbol string by combining the plurality of functions; a feature quantity calculation function of inputting each symbol string input by the input function to each feature quantity function generated by the feature quantity function generation function, and calculating a feature quantity corresponding to each symbol string; an estimation function generation function of executing machine learning using the attribute information corresponding to each symbol string input by the input function and the feature quantity corresponding to each symbol string calculated by the feature quantity calculation function, and generating an estimation function for estimating the attribute information from the feature quantity; and an output function of outputting the feature quantity functions generated by the feature quantity function generation function and the estimation function generated by the estimation function generation function.

According to another embodiment of the present disclosure, there is provided a computer-readable recording medium in which the program is recorded.

According to the embodiments of the present disclosure described above, it is possible to automatically construct a language analysis algorithm without relying on a type of language. Further, it is possible to automatically construct an analysis algorithm of receiving any symbol string and estimating attribute information expressing a feature of the symbol string.

BRIEF DESCRIPTION OF THE DRAWINGS

FIG. 4 is an illustrative diagram illustrating a configuration of learning data used in the automatic algorithm construction method according to the same embodiment;

FIG. 5 is an illustrative diagram illustrating an N-gram analysis method according to the same embodiment;

FIG. 6 is an illustrative diagram illustrating a method of calculating a feature quantity function according to the same embodiment;

FIG. 7 is an illustrative diagram illustrating a method of calculating an estimation function according to the same embodiment;

FIG. 8 is an illustrative diagram illustrating a method of selecting an effective feature quantity function according to the same embodiment;

DETAILED DESCRIPTION OF THE EMBODIMENT(S)

Figure 1:
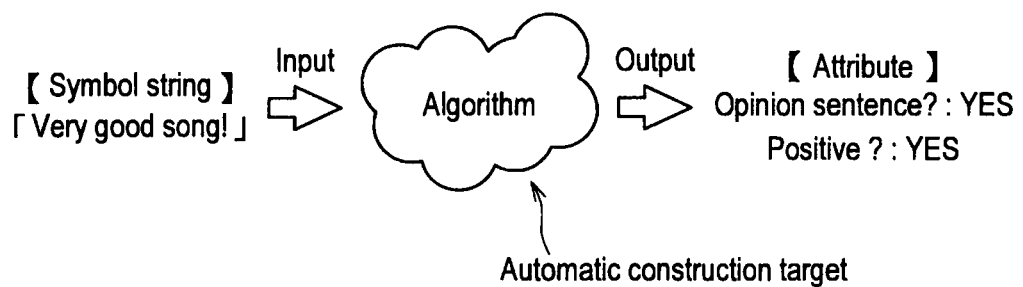
FIG. 1 is an illustrative diagram illustrating an overview of an automatic algorithm construction method according to an embodiment of the disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Description Flow]

Here, the description flow related to an embodiment of the present disclosure disclosed below will be briefly described. First, an overview of an automatic algorithm construction method according to the embodiment of the present disclosure will be described with reference to FIGS. 1 and 2. Then, a functional configuration of an information processing device 100 (a learning device) according to the same embodiment will be described with reference to FIG. 3. Herein, a configuration of learning data, an N-gram analysis method, a method of calculating a feature quantity function, and a method of calculating an estimation function, a method of selecting an effective feature quantity function, and the like will also be described with reference to FIGS. 4 to 8.

Then, an entire flow of processing related to the automatic algorithm construction method of the same embodiment will be described with reference to FIG. 9. Then, a flow of processing related to the N-gram analysis method of the same embodiment will be described with reference to FIG. 10. Then, an entire flow of processing related to the method of generating a feature quantity function according to the same embodiment will be described with reference to FIGS. 11 to 18. Then, a flow of processing related to the method of calculating a feature quantity function according to the same embodiment will be described with reference to FIG. 19. Then, a flow of processing related to the method of calculating an estimation function according to the same embodiment will be described with reference to FIG. 20.

Then, a functional configuration of an information processing device 200 (an estimation device) according to the same embodiment will be described with reference to FIG. 21. Then, a flow of processing related to a method of estimating attribute information according to the same embodiment will be described with reference to FIG. 22. Then, hardware configurations capable of implementing functions of the information processing devices 100 and 200 according to the same embodiment will be described with reference to FIG. 23. Finally, technical ideas of the same embodiment will be summarized and function effects obtained from the technical ideas will be briefly described.

(Description Items)
1: Embodiment
  1-1: Overview
  1-2: Functional Configuration of Information Processing Device 100 (Learning Device)
  1-3: Automatic Algorithm Construction Method
    1-3-1: Entire Processing Flow
    1-3-2: N-gram Analysis
    1-3-3: Generation of Feature Quantity Function
    1-3-4: Calculation of Feature Quantity Function
    1-3-5: Generation of Estimation Function
  1-4: Functional Configuration of Information Processing Device 200 (Estimation Device)
  1-5: Method of Estimating Attribute Information
  1-6: Hardware Configuration
2: Summary 1: Embodiment The embodiment of the present disclosure will be described. This embodiment relates to an automatic algorithm construction method of analyzing any symbol string and automatically constructing an analysis algorithm capable of estimating attribute information expressing a feature of the symbol string.

[1-1: Overview]

First, the overview of the automatic algorithm construction method according to this embodiment will be briefly described with reference to FIG. 1.

As described above, the automatic algorithm construction method according to this embodiment is a method of automatically constructing an analysis algorithm capable of receiving any symbol string (for example, a character string, a genetic sequence, or the like) and estimating attribute information expressing a feature of the symbol string. According to this method, for example, as shown in FIG. 1, if a character string "Very good song!" is input, it is possible to automatically construct an analysis algorithm of outputting attribute information "The character string is an opinion sentence," or "The character string is positive."

For example, the method of this embodiment can be applied to automatically construct an analysis algorithm of receiving mail text and automatically classifying whether the mail is junk mail or normal mail. The method of this embodiment can be applied to automatically construct an analysis algorithm of receiving mail text and automatically sorting the mail into a folder pre-classified for each use application. Additionally, the method of this embodiment can be applied to automatically construct an analysis algorithm of receiving text written to a bulletin board on a network and automatically discriminating whether the written text is objective content or subjective content. Also, the method of this embodiment can be applied to automatically construct an analysis algorithm of receiving text written to a bulletin board on a network and automatically classifying whether its written content is positive writing or negative writing.

Further, the method of this embodiment can be applied to automatically construct an analysis algorithm of receiving text of news and automatically discriminating a category (for example, politics, economics, arts, technology, international, or the like) into which the news is classified. Also, the method of this embodiment can be applied to automatically construct an analysis algorithm of receiving any text and automatically discriminating a language (for example, English, Japanese, German, or the like) in which the text is written. Additionally, the method of this embodiment can be applied to automatically construct an analysis algorithm of receiving text related to content (for example, text content such as news or a novel, a review for music, video, or the like, or an introduction sentence) and automatically extracting a preference for the content.

Also, an analysis algorithm capable of being automatically constructed by the method of this embodiment can set any symbol string to a target. For example, the method of this embodiment can be applied to automatically construct an analysis algorithm of receiving an emoticon and automatically classifying a category (for example, laughing, crying, angry, or the like) to which the emoticon belongs. Further, the method of this embodiment can be applied to automatically construct an analysis algorithm of receiving a symbol string in which a name is converted into Roman characters, and automatically classifying whether the name is Japanese or Western, or whether the name is a new sound or an archaic sound, from the atmosphere of phonemes of the name.

Also, the method of this embodiment can be applied to automatically construct an analysis algorithm of receiving a character string indicating musical code progression or a character string of melody described in MML, and automatically discriminating its musical mood (for example, bright, dark, calm, spirited, or the like). The above-described MML stands for "music macro language." Additionally, the method of this embodiment can be applied to automatically construct an analysis algorithm of receiving text of a novel and automatically discriminating a category (for example, modern, romance, historical, fantasy, horror, or the like) to which the novel belongs.

Also, an analysis algorithm capable of being automatically constructed by the method of this embodiment is not limited to only the extraction of an existing feature of an input symbol string. For example, the method of this embodiment can be applied to automatically construct an analysis algorithm of receiving text of economic news and estimating an economic prospect (for example, an increase/decrease of a stock price, or the like). Also, the method of this embodiment can be applied to automatically construct an analysis algorithm of receiving caption data of a broadcast program or movie, automatically estimating a scene or mood of the broadcast program or movie, and assigning its estimation result as metadata to the broadcast program or movie. The scene is, for example, news, sports, variety, CM, or the like. The mood is, for example, light, serious, romantic, or the like.

Also, the method of this embodiment can be applied to automatically construct an analysis algorithm of receiving written text of a blog or the like, and automatically estimating the age or personality of a writer (for example, bright, dark, active, passive, or the like). Further, the method of this embodiment can be applied to automatically construct an analysis algorithm of receiving text in which a subjective symptom of a disease is described and automatically estimating a disease name, or displaying advice corresponding to an estimation result. Additionally, the method of this embodiment can be applied to automatically construct an analysis algorithm of receiving text of materials submitted by an examinee during entrance examination and estimating a personnel evaluation five years after the examinee joined the company.

Also, the method of this embodiment can be applied to automatically construct an analysis algorithm of receiving a symbol string expressing a base sequence of a gene and estimating a disease of a human being or an animal having the gene that may occur in the future. The method of this embodiment can be applied to automatically construct an analysis algorithm of receiving a symbol string expressing a base sequence of a gene and estimating a personality of a human being or an animal having the gene. As described above, because the method of this embodiment can be applied to an analysis algorithm in which any symbol string is set to a target, its application range is significantly wide.

Figure 2:
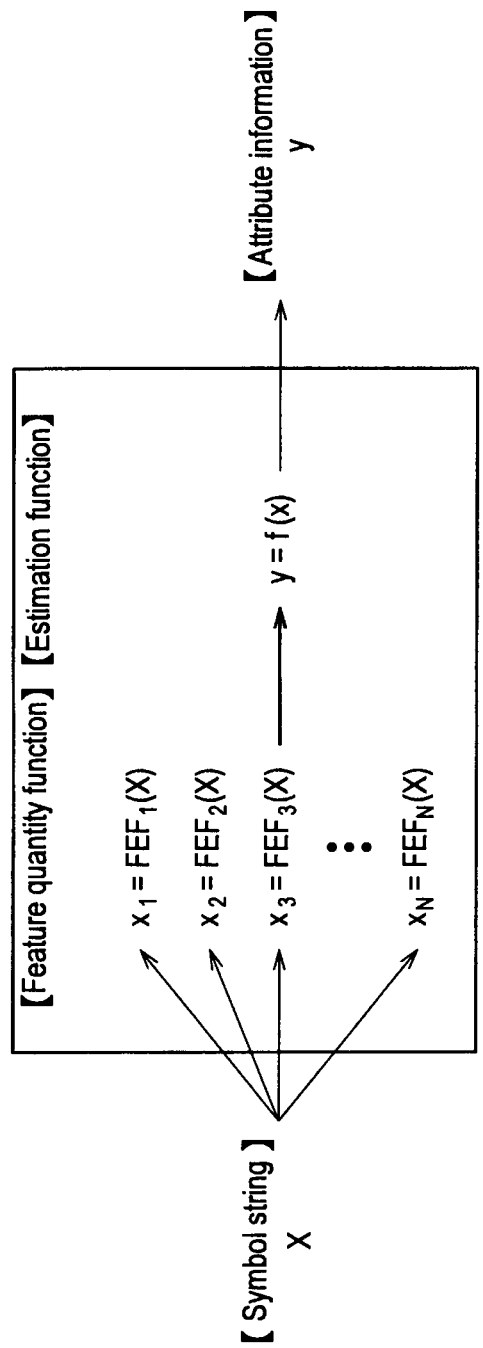
FIG. 2 is an illustrative diagram illustrating an overview of the automatic algorithm construction method according to the same embodiment.

Incidentally, an analysis algorithm automatically constructed by the method of this embodiment is configured as shown in FIG. 2. As shown in FIG. 2, if a symbol string X is input, the analysis algorithm first calculates a feature quantity by inputting the input symbol string X to a feature quantity function FEF, and calculates attribute information y by inputting the feature quantity to an estimation function f. The feature quantity function FEF and the estimation function f are automatically pre-generated by the method of this embodiment. In other words, a mechanism of automatically generating a set of a feature quantity function FEF and an estimation function f capable of accurately estimating attribute information is an automatic algorithm construction method according to this embodiment.

The overview of the automatic algorithm construction method according to this embodiment has been described above.

[1-2: Functional Configuration of Information Processing Device 100 (Learning Device)]

Figure 3:
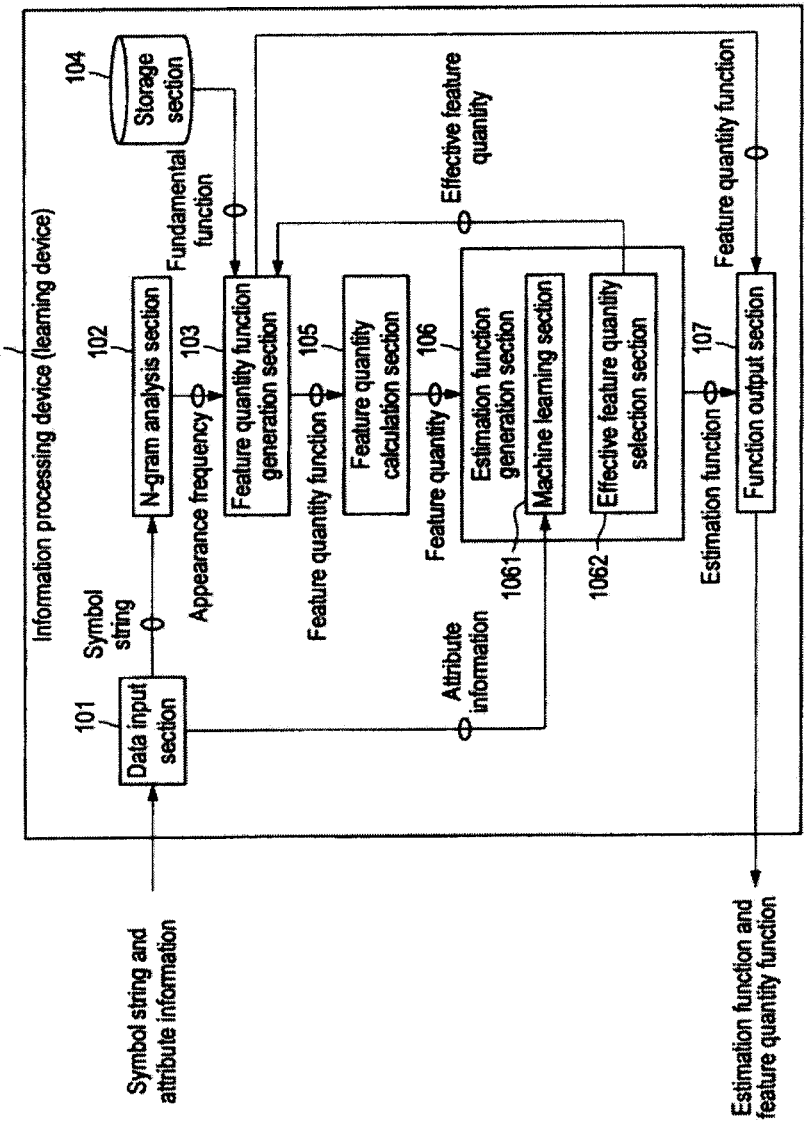
FIG. 3 is an illustrative diagram illustrating a functional configuration of an information processing device (learning device) according to the same embodiment.

Next, the functional configuration of the information processing device 100 (the learning device) capable of implementing the automatic algorithm construction algorithm according to this embodiment will be described with reference to FIG. 3. FIG. 3 is an illustrative diagram illustrating the functional configuration of the information processing device 100 according to this embodiment.

As shown in FIG. 3, the information processing device 100 has a data input section 101, an N-gram analysis section 102, a feature quantity function generation section 103, a storage section 104, a feature quantity calculation section 105, an estimation function generation section 106, and a function output section 107. The estimation function generation section 106 includes a machine learning section 1061 and an effective feature quantity selection section 1062.

First, a set of a symbol string and attribute information is input to the data input section 101 as learning data. For example, a set of a symbol string X and attribute information t as shown in FIG. 4 is input to the data input section 101. In an example of FIG. 4, the symbol string X is a character string and the attribute information t is an index indicating whether or not the character string is an opinion sentence. For example, a character string "We should have done it earlier . . . " expresses an opinion of a person. Thus, a value 1 indicating the opinion sentence is assigned to the character string as the attribute information t. On the other hand, a character string "It is fine today." does not express an opinion of a person. Thus, a value 0 not indicating the opinion sentence is assigned to the character string as the attribute information t.

As described above, a set of a symbol string and attribute information is input to the data input section 101. If the set of a symbol string and attribute information is input, the data input section 101 inputs the input symbol string to the N-gram analysis section 102 and the feature quantity calculation section 105. Also, the data input section 101 inputs the attribute information to the machine learning section 106 included in the estimation function generation section 106. If the symbol string is input, the N-gram analysis section 102 extracts an N-gram (a symbol unit constituted by N symbols) from the input symbol string, and detects an appearance frequency of each N-gram as shown in FIG. 5. A symbol unit constituted by one symbol is referred to as a unigram, and a symbol unit constituted by two symbols is referred to as a bigram.

For example, if a string "abcababcdedef" is input, the N-gram analysis section 102 extracts {a, b, c, a, b, a, b, c, d, e, d, e, f} by combining unigrams. Also, the N-gram analysis section 102 extracts {ab, bc, ca, ab, ba, ab, bc, cd, de, ed, de, ef} by combining bigrams. Likewise, the N-gram analysis section 102 extracts a combination of m-grams (m=3 to 13) from the input character string. If a length of the character string is L, a combination of (L−m+1) m-grams is extracted.

Then, the N-gram analysis section 102 sorts a combination of extracted n-grams (n=1 to 13) in order of symbol index (for example, character code). For example, a unigram combination {a, b, c, a, b, a, b, c, d, e, d, e, f} is sorted into {a, a, a, b, b, b, c, c, d, d, e, e, f} by the N-gram analysis section 102. In addition, a bigram combination {ab, bc, ca, ab, ba, ab, bc, cd, de, ed, de, ef} is sorted into {ab, ab, ab, ba, bc, bc, ca, cd, de, de, ed, ef} by the N-gram analysis section 102. Likewise, a combination of m-grams (m=3 to 13) is sorted.

Then, the N-gram analysis section 102 detects an appearance frequency of each n-gram on the basis of each n-gram combination after sorting, and generates appearance frequency information. For example, the N-gram analysis section 102 generates appearance frequency information {a:3, b:3, c:2, d:2, e:2, f:1} from the unigram combination {a, a, a, b, b, b, c, c, d, d, e, e, f} after sorting. The appearance frequency information expresses that a appears thrice, b appears thrice, c appears thrice, d appears twice, e appears twice, and f appears once. Also, the N-gram analysis section 102 generates appearance frequency information {ab:3, ba:1, bc:2, ca:1, cd:1, de:2, ed:1, ef:1} from the bigram combination {ab, ab, ab, ba, bc, bc, ca, cd, de, de, ed, ef} after sorting. Likewise, appearance frequency information is also generated from an m-gram combination.

Then, the N-gram analysis section 102 integrates appearance frequency information of n-grams (n=1 to 13) into one and sorts the appearance frequency information in order of appearance frequency. For example, if the unigram appearance frequency information {a:3, b:3, c:2, d:2, e:2, f:1} and the bi-gram appearance frequency information {ab:3, ba:1, bc:2, ca:1, cd:1, de:2, ed:1, ef:1} are integrated and sorted in descending order of appearance frequency, {a:3, b:3, ab:3, c:2, d:2, e:2, bc:2, de:2, f:1, ba:1, ca:1, cd:1, ed:1, ef:1} is obtained. If this processing is applied to the symbol string X illustrated in FIG. 4, appearance frequency information indicating each n-gram appearance frequency is obtained as shown in FIG. 5.

As described above, the appearance frequency information generated by the N-gram analysis section 102 is input to the feature quantity function generation section 103. As described above, the symbol string from the data input section 101 is input, and the appearance frequency information from the N-gram analysis section 102 is input, to the feature quantity function generation section 103. If the symbol string is input, the feature quantity function generation section 103 generates a feature quantity function FEF by combining fundamental functions already prepared in the storage section 104. The fundamental functions are, for example, Cut, Find, Mean, Variance, Median, Length, Variation, Appearance, Co-Occurrence, Pow, and the like Here, description of an example of the above-described fundamental functions is supplemented.

The above-described fundamental function Cut is a function of receiving a symbol string and outputting a symbol string. The fundamental function Cut is expressed as Cut (symbol string X, start position S, length L), and is a function of extracting a symbol string of the designated length L from the designated start position S of the designated symbol string X. For example, if the symbol string X is X="ABCDABABCA", Cut(X, 0.2, 0.5)="CDABA". In this example, a symbol string having a length 0.5 is extracted from a position corresponding to 0.2 by expressing a length of the symbol string X as 1.0.

The above-described fundamental function Find is a function of receiving a symbol string and outputting a vector. The fundamental function Find is expressed as Find(symbol string X, symbol string X'), and is a function of detecting a position where the designated symbol string X' appears from the designated symbol string X and outputting a vector indicating the position. For example, if the symbol string X is X="CDABA", Find(X, "A")={0.4, 0.8}. In this example, a symbol string "A" is detected in a position corresponding to 0.4 and a position corresponding to 0.8 by expressing a length of the symbol string X as 1.0.

The above-described fundamental functions Mean, Variance, and Median are functions of receiving a vector and outputting a scalar. The fundamental function Mean is a function of calculating a mean of all elements of an input vector. The fundamental function Variance is a function of calculating a variance of all elements of an input vector. The fundamental function Median is a function of calculating a central value of all elements of an input vector. For example, if a vector V={0.4, 0.8}, Mean(V)=0.6.

The above-described fundamental functions Length, Variation, Appearance, and Co-Occurrence are functions of receiving a symbol string and outputting a scalar. The fundamental function Length is a function of outputting a length of an input symbol string. The fundamental function Variation is a function of counting types of symbols included in an input symbol string and outputting the number of types. The fundamental function Appearance is expressed as Appearance (symbol string X, symbol string X'), and is a function of outputting the number of times of appearance of a designated symbol string X' in a designated symbol string X. Further, the fundamental function Co-Occurrence is expressed as Co-Occurrence(symbol string X, symbol string $X_1$, symbol string $X_2$), and is a function of outputting the number of times of co-occurrence of the symbol strings $X_1$ and $X_2$ in the symbol string X.

The above-described fundamental function Pow is a function of receiving a scalar and outputting a scalar. The fundamental function Pow is expressed as Pow(number q, number n), and is a function of raising the designated number q to the n-th power. For example, if the number q is q=0.6, Pow(q, 2)=0.36.

As described above, the feature quantity function generation section 103 can use various fundamental functions for generating a feature quantity function FEF.

The feature quantity function generation section 103 combines fundamental functions as described above and generates a plurality of feature quantity functions FEF. First, the feature quantity function generation section 103 randomly selects a fundamental function to which a symbol string can be input. If there is a parameter to be input to the randomly selected fundamental function, the feature quantity function generation section 103 randomly decides the parameter to be input.

Thereafter, the feature quantity function generation section 103 checks whether or not an output of the randomly selected fundamental function is a scalar. The feature quantity function generation section 103 further checks whether or not a termination condition related to the fundamental function selection has been satisfied. As the termination condition related to the fundamental function selection, for example, a condition that the selection is terminated if a generated random number is equal to or less than a predetermined value is considered. If the output of the randomly selected fundamental function is the scalar and the termination condition related to the fundamental function selection has been satisfied, the feature quantity function generation section 103 terminates the fundamental function selection.

On the other hand, if the output of the randomly selected fundamental function is not a scalar, or if the termination condition related to the fundamental function selection has not been satisfied, the feature quantity function generation section 103 randomly selects the next fundamental function. At this time, the feature quantity function generation section 103 randomly selects a fundamental function from among fundamental functions corresponding to output types of previously selected fundamental functions (for example, a symbol string, a scalar, a vector, and the like). For example, if the output of the previously selected fundamental function is a vector, the feature quantity function generation section 103 randomly selects the next fundamental function from among fundamental functions to which the vector can be input. If there is a parameter to be input to the randomly selected fundamental function, the feature quantity function generation section 103 randomly decides the parameter to be input.

Thereafter, the feature quantity function generation section 103 checks whether or not an output of the randomly selected next fundamental function is a scalar. The feature quantity function generation section 103 further checks whether or not a termination condition related to the fundamental function selection has been satisfied. If the output of the randomly selected next fundamental function is the scalar and the termination condition related to the fundamental function selection has been satisfied, the feature quantity function generation section 103 terminates the fundamental function selection. On the other hand, if the output of the randomly selected fundamental function is not the scalar, or if the termination condition related to the fundamental function selection has not been satisfied, the feature quantity function generation section 103 randomly selects the next fundamental function.

As described above, fundamental functions are sequentially selected by the feature quantity function generation section 103. If an output of the last selected fundamental function is a scalar and the termination condition related to the fundamental function selection has been satisfied, the fundamental function selection by the feature quantity function generation section 103 is terminated. If the fundamental function selection is terminated, the feature quantity function generation section 103 generates a feature quantity function FEF by combining the selected fundamental functions in order of selection.

For example, if the fundamental functions Cut, Find, Mean, and Pow have been sequentially selected, the feature quantity function generation section 103 generates FEF(X)=Pow(Mean(Find(Cut(X, 0.2, 0.5), "A")), 2) to which the symbol string X can be input. For example, if the symbol string X="ABCDABABCA" is input to the feature quantity function FEF(X), Y=FEF(X)=0.36 is obtained. Parameters "0.2" and "0.5" of the fundamental function Cut, a parameter "A" of the fundamental function Find, and a parameter "2" of the fundamental function Pow are parameters randomly selected by the feature quantity function generation section 103.

When the symbol string parameter of the fundamental function (for example, the parameter "A" of the above-described fundamental function Find, or the like) is decided, the feature quantity function generation section 103 uses n-gram appearance frequency information input by the N-gram analysis section 102. Specifically, when the feature quantity function generation section 103 decides a symbol string parameter, the symbol string parameter is decided using a random number so that a probability of selection of n-grams having a high appearance frequency becomes high on the basis of the appearance frequency information input by the N-gram analysis section 102. The feature quantity function generation section 103 generates a plurality of feature quantity functions FEF as described above. The plurality of feature quantity functions FEF generated by the feature quantity function generation section 103 are input to the feature quantity calculation section 105 and the function output section 107.

If the plurality of feature quantity functions FEF are input, the feature quantity calculation section 105 receives a symbol string input by the data input section 101 for each input feature quantity function FEF, and calculates a feature quantity of the symbol string. For example, if a feature quantity function $FEF_j$ (j=1 to N) and a symbol string X have been input, the feature quantity calculation section 105 calculates a feature quantity $x_j=FEF_j(X)$ by inputting the symbol string X to the feature quantity function $FEF_j$ as shown in FIG. 6. For example, if a feature quantity function $FEF_j(X)$=Appearance (Cut(X, 0.0, 0.3), "OO"), $x_1=FEF_1$("We should have done it earlier . . . ")=0. Likewise, if a feature quantity function $FEF_N(X)$=Appearance(X, "."), $x_N=FEF_N$("It is fine today.")=1.

A feature quantity calculated by the feature quantity calculation section 105 as described above is input to the estimation function generation section 106. If the feature quantity is input, the estimation function generation section 106 generates an estimation function for estimating attribute information from the input feature quantity by a machine leaning function of the machine learning section 1061. For example, as shown in FIG. 7, attribute information t and a feature quantity $x_j=FEF_j(X)$ (j=1 to N) corresponding to a symbol string X are input to the machine learning section 1061. The machine learning section 1061 generates an estimation function $f(x)=w^T x$ for outputting the attribute information t if a feature quantity vector $x=\{x_1, \ldots, x_N\}$ has been input by machine learning. That is, the machine learning section 1061 calculates w (linear combination weight) when $t=w^T x$ by machine learning.

A method of calculating the estimation function f(x) is not limited thereto, and, for example, the method disclosed in Japanese Patent Application Laid-Open No. 2009-048266 can be used. Additionally, any method capable of calculating the estimation function f(x) for estimating an objective variable (corresponding to attribute information t) from a multi-dimensional dependent variable (corresponding to a feature quantity vector x) can be used as a method of calculating the estimation function f(x) by the machine learning section 1061. Here, for convenience of description, it is assumed that a method of a type of calculating the above-described linear combination weight w is used.

The estimation function f calculated by the machine learning section 1061 as described above is input to the effective feature quantity selection section 1062. If the estimation function f is input, the effective feature quantity selection section 1062 refers to the linear combination weight w constituting the input estimation function f, and selects an effective feature quantity from among feature quantities $x_1$ to $x_N$. Here, the effective feature quantity is a feature quantity contributing to a calculation result when the estimation function f is calculated. For example, if an element $w_k$ of the linear combination weight $w=\{w_1, \ldots, W_N\}$ is 0, the same calculation result $t=w^T x$ is obtained, regardless of a value of a feature quantity $x_k$. The effective feature quantity selection section 1062 detects an element of the linear combination weight w, which becomes a value less than a predetermined value, or 0, and selects a feature quantity corresponding to an element other than the detected element.

Information of an effective feature quantity selected by the effective feature quantity selection section 1062 is reported to the feature quantity function generation section 103, and used to select a feature quantity function. For example, as shown in FIG. 8, if a feature quantity $x_k$ calculated by a feature quantity function $FEF_j(X)$=Appearance(Cut(X, 0.0, 0.3), "OO") contributes to the calculation result of the estimation function f(x), the feature quantity function $FEF_k$ is selected as the effective feature quantity function. Likewise, if a feature quantity $x_q$ calculated by a feature quantity function $FEF_q(X)$=Pow(Median(Find(Cut(X, 0.1, 0.3), "A")), 2) does not contribute to the calculation result of the estimation function f(x), the feature quantity function $FEF_q$ is not selected as the effective feature quantity function.

If the effective feature quantity is reported, the feature quantity function generation section 103 selects an effective feature quantity function on the basis of the reported content, and keeps the selected feature quantity function as a next-generation feature quantity function. Further, the feature quantity function generation section 103 generates the next-generation feature quantity function using the selected feature quantity function (hereinafter, a previous-generation feature quantity function). First, the feature quantity function generation section 103 generates a predetermined number of feature quantity functions by combining randomly selected fundamental functions. At this time, the feature quantity function generation section 103 randomly decides a parameter of a fundamental function, if necessary.

Then, the feature quantity function generation section 103 generates a next-generation feature quantity function by changing part of the previous-generation feature quantity function (mutation).

For example, the feature quantity function generation section 103 adds a fundamental function Cut to a previous-generation feature quantity function FEF(X)=Pow(Median (Find(X, "B")), 2), and generates a next-generation feature quantity function FEF(X)=Pow(Median(Find(Cut(X, 0.1, 0.3), "B")), 2) (fundamental function addition).

The feature quantity function generation section 103 generates a next-generation feature quantity function FEF(X)= Pow(Variance(Find(X, "B")), 2) by changing the fundamental function Median to the fundamental function Variance for the previous-generation feature quantity function FEF(X)= Pow(Median(Find(X, "B")), 2) (fundamental function change).

The feature quantity function generation section 103 deletes the fundamental function Pow included in the previous-generation feature quantity function FEF(X)=Pow(Median(Find(X, "B")), 2), and generates a next-generation feature quantity function FEF(X)=Median(Find(X, "B")) (fundamental function deletion).

The feature quantity function generation section 103 randomly changes a parameter of the fundamental function Find included in the previous-generation feature quantity function FEF(X)=Pow(Median(Find(X, "B")), 2) at a predetermined probability, and generates a next-generation feature quantity function FEF(X)=Pow(Median(Find(X, "BL")), 2) (fundamental function parameter change). In the change of a symbol string parameter, an analysis result by the N-gram analysis section 102 may be used. For example, the symbol string parameter may be changed for a change to n-grams including a symbol string of a current symbol string parameter or n-grams including part of the symbol string.

The feature quantity function generation section 103 may be configured to generate a next-generation feature quantity function FEF by combining the above-described "fundamental function addition," "fundamental function change," "fundamental function deletion," and "fundamental function parameter change."

Then, the feature quantity function generation section 103 generates a next-generation feature quantity function by crossing two previous-generation feature quantity functions (crossover).

First, the feature quantity function generation section 103 selects two previous-generation feature quantity functions and detects parts having a common output type (a symbol string, a vector, or a scalar). For example, the case where $FEF_1(X)$=Pow(Median(Find(Cut(X, 0.1, 0.3), "B")), 2) and $FEF_2(X)$=Variance(Find(X, "Foo")) are selected from the previous-generation feature quantity functions is considered. The two feature quantity functions $FEF_1$ and $FEF_2$ commonly include a part Find( . . . ) in which the output type is the vector. The feature quantity function generation section 103 generates a next-generation feature quantity function FEF(X)=Pow (Median(Find(X, "Foo")), 2) by crossing parts of Find( . . . ).

As described above, a next-generation feature quantity function generated by an evolutionary technique (selection, random generation, mutation, or crossover) is input to the feature quantity calculation section 105. If the next-generation feature quantity function is input, the feature quantity calculation section 105 calculates a feature quantity by inputting a symbol string to the input next-generation feature quantity function. The feature quantity calculated by the feature quantity calculation section 105 is input to the estimation function generation section 106. If the feature quantity calculated using the next-generation feature quantity function is input, the estimation function generation section 106 estimates an estimation function f by the function of the machine learning section 1061, and selects an effective feature quantity by the function of the effective feature quantity selection section 1062. Information of the effective feature quantity selected by the effective feature quantity selection section 1062 is reported to the feature quantity function generation section 103.

If the information of the effective feature quantity is reported, the feature quantity function generation section 103 selects an effective feature quantity function on the basis of the reported effective feature quantity information, and keeps the selected feature quantity function as a next-generation feature quantity function. Then, the feature quantity function generation section 103 generates the next-generation feature quantity function using the selected feature quantity function. The next-generation feature quantity function generated by the feature quantity function generation section 103 is input to the feature quantity calculation section 105. If the next-generation feature quantity function is input, the feature quantity calculation section 105 calculates a feature quantity by inputting a symbol string to the input next-generation feature quantity function. The feature quantity calculated by the feature quantity calculation section 105 is input to the estimation function generation section 106. If the feature quantity is input by the feature quantity calculation section 105, the estimation function generation section 106 generates an estimation function on the basis of the input feature quantity.

As described above, in the information processing device 100, generation alternation is iteratively executed for a feature quantity function, and a set of feature quantity functions and an estimation function are sequentially generated. The iterative processing is performed until a predetermined termination condition (for example, the presence/absence of termination manipulation by a user) is satisfied. If the predetermined termination condition has been satisfied, the estimation function generation section 106 inputs a current-generation estimation function to the function output section 107. The feature quantity function generation section 103 inputs a set of current-generation feature quantity functions to the function output section 107. If the estimation function and the set of feature quantity functions are input, the function output section 107 outputs the estimation function and the set of feature quantity functions input.

The functional configuration of the information processing device 100 according to this embodiment has been described above. As described above, the information processing device 100 iteratively performs processing such as feature quantity function generation, feature quantity calculation, estimation function generation, and effective feature quantity selection. Also, the information processing device 100 performs generation alternation for a feature quantity function on the basis of the evolutionary technique by the function of the feature quantity function generation section 103. As described above, an estimation function and a set of feature quantity functions are obtained, which can accurately calculate attribute information from a given symbol string by iteratively optimizing a feature quantity function on the basis of the evolutionary technique. That is, an algorithm of accurately estimating attribute information from a symbol string is automatically constructed.

[1-3: Automatic Algorithm Construction Method]

Next, a flow of processing related to the automatic algorithm construction method of this embodiment will be described.

(1-3-1: Entire Processing Flow)

First, the entire flow of processing related to the automatic algorithm construction method of this embodiment will be described with reference to FIG. 9. FIG. 9 is an illustrative diagram illustrating the entire flow of processing related to the automatic algorithm construction method of this embodiment.

Figure 9:
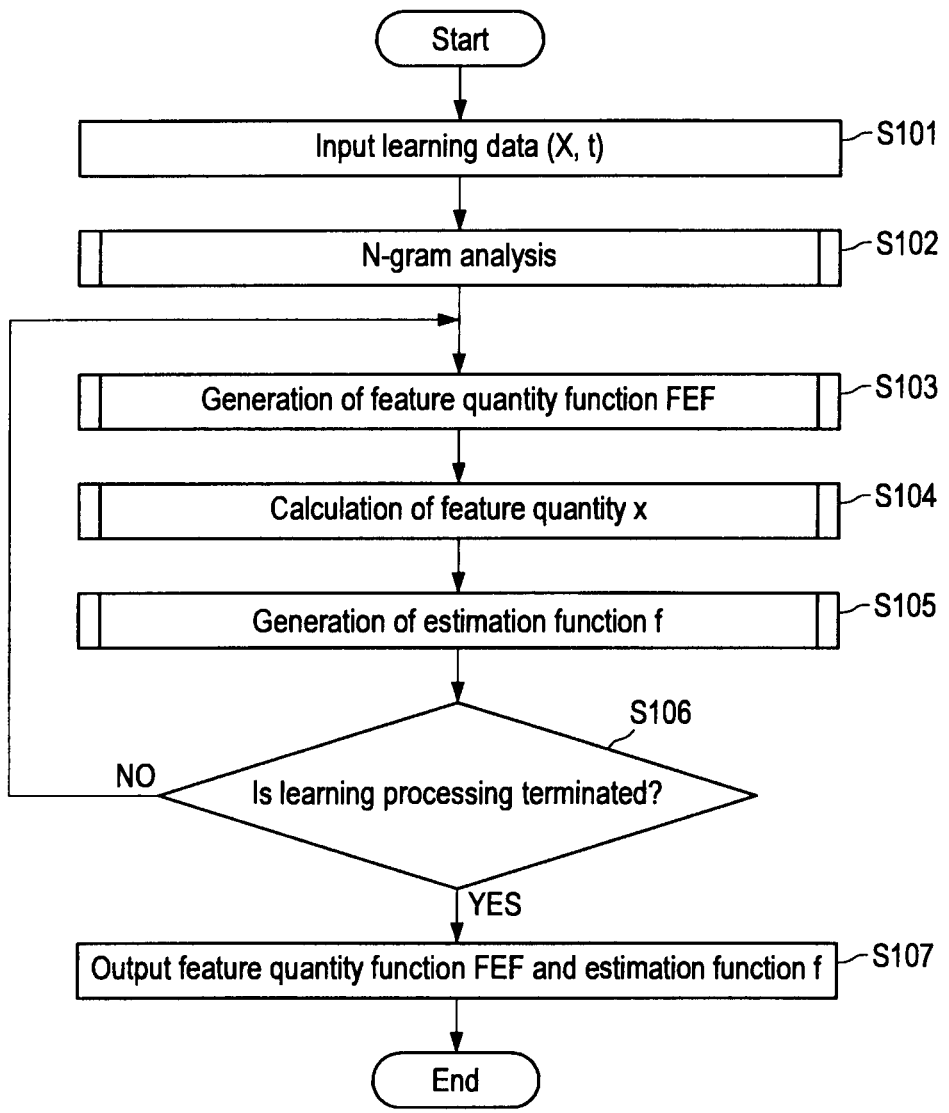
FIG. 9 is an illustrative diagram illustrating an entire configuration of an automatic algorithm construction method according to the same embodiment.

As shown in FIG. 9, first, learning data (a symbol string X and attribute information t) is input to the information processing device 100 (S101). If the learning data is input, the information processing device 100 performs N-gram analysis for the input symbol string X by the function of the N-gram analysis section 102 (S102). Then, the information processing device 100 generates a plurality of feature quantity functions by the function of the feature quantity function generation section 103 (S103). Then, the information processing device 100 calculates a feature quantity by inputting the symbol string X to each feature quantity function by the function of the feature quantity calculation section 105 (S104). Then, the information processing device 100 generates an estimation function using the calculated feature quantity and the attribute information t by the function of the estimation function generation section 106 (S105).

Then, the information processing device 100 determines whether or not to terminate learning processing (update processing of the feature quantity function and the estimation function) on the basis of a predetermined termination condition (for example, the presence/absence of termination manipulation by the user) (S106). If the learning processing is terminated, the information processing device 100 moves the processing to step S107. On the other hand, if the learning processing is not terminated, the information processing device 100 returns the processing to step S103. If the processing moves to step S107, the information processing device 100 outputs the feature quantity function and the estimation function by the function of the function output section 107 (S107).

The entire processing flow has been described above. Hereinafter, processing flows in N-gram analysis processing, feature quantity function generation processing, feature quantity calculation processing, and estimation function generation processing will be described in more detail.

(1-3-2: N-gram Analysis)

Figure 10:
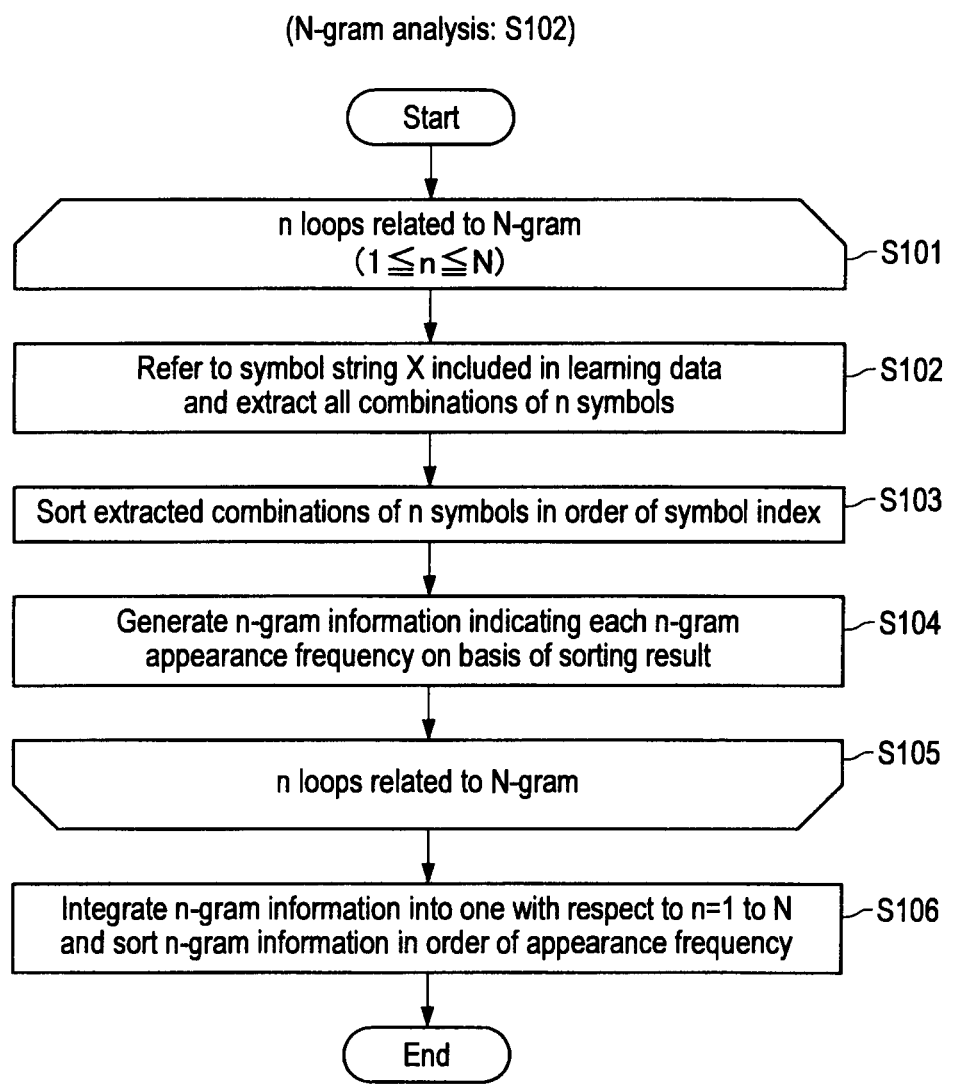
FIG. 10 is an illustrative diagram illustrating an N-gram analysis method according to the same embodiment.

First, the flow of the N-gram analysis processing will be described in more detail with reference to FIG. 10. FIG. 10 is an illustrative diagram illustrating the flow of the N-gram analysis processing. The N-gram analysis processing is mainly performed by the N-gram analysis section 102.

As shown in FIG. 10, the N-gram analysis section 102 starts an N-gram-related processing loop (n=1 to N loops) (S111). If the N-gram-related processing loop is started, the N-gram analysis section 102 first sets n=1, and extracts all one-symbol combinations from a symbol string X included in learning data (S112). For example, if "abcababcdedef" is given as the symbol string X, the N-gram analysis section 102 extracts all unigrams {a, b, c, a, b, a, b, c, d, e, d, e, f} from the symbol string X.

Then, the N-gram analysis section 102 sorts the extracted unigrams in order of symbol index (for example, character code) (S113). For example, if a set of extracted unigrams is {a, b, c, a, b, a, b, c, d, e, d, e, f}, the N-gram analysis section 102 sorts the set of unigrams into {a, a, a, b, b, b, c, c, d, d, e, e, f}. Then, the N-gram analysis section 102 detects each unigram appearance frequency on the basis of a set of sorted unigrams, and generates n-gram information (appearance frequency information) indicating the appearance frequency (S114). For example, if the set of sorted unigrams is {a, a, a, b, b, b, c, c, d, d, e, e, f}, the N-gram analysis section 102 generates {a:3, b:3, c:2, d:2, e:2, f:1} as the unigram appearance frequency information.

Then, the N-gram analysis section 102 increments n by 1 (S115), and re-executes the processing steps of steps S112 to S114. If the processing of steps S112 to S114 for n=1 to N is completed, the N-gram analysis section 102 terminates the N-gram-related processing loop and moves the processing to step S116 (S115). If the processing moves to step S116, the N-gram analysis section 102 integrates unigram to N-gram appearance frequency information into one, and sorts the appearance frequency information in descending order of appearance frequency (S116). The appearance frequency information sorted in step S116 is input to the feature quantity function generation section 103, and a series of processing related to the N-gram analysis are terminated.

The flow of N-gram analysis processing has been described above.

(1-3-3: Generation of Feature Quantity Function)

Next, a flow of processing related to the feature quantity function generation will be described in more detail with reference to FIGS. 11 to 18. FIGS. 11 to 18 are illustrative diagrams illustrating more details of processing related to the feature quantity function generation. The processing related to the feature quantity function generation is executed by the feature quantity function generation section 103.

Figure 11:
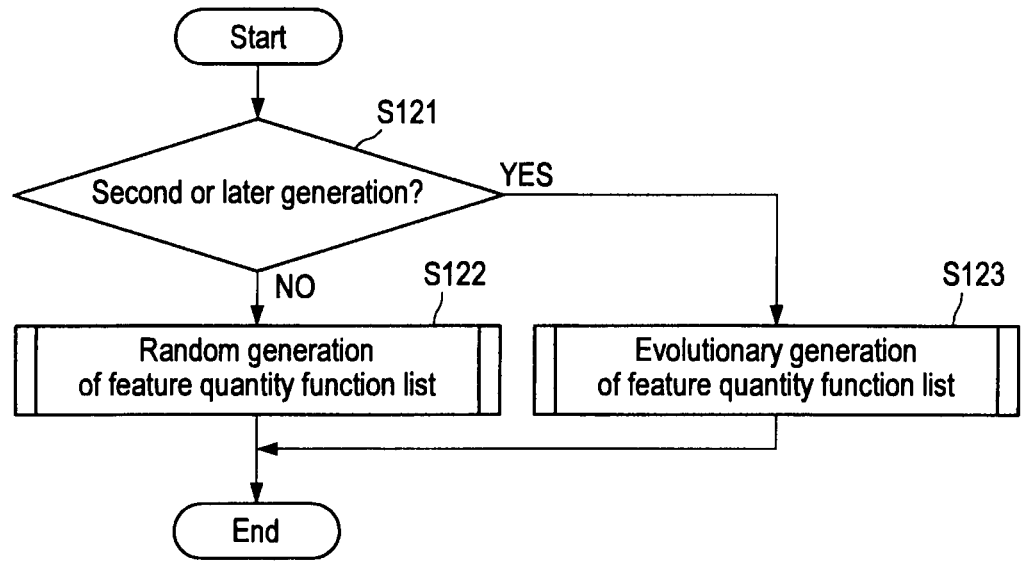
FIG. 11 is an illustrative diagram illustrating a method of generating a feature quantity function (an entire configuration) according to the same embodiment.

First, refer to FIG. 11. As shown in FIG. 11, the feature quantity function generation section 103 determines whether or not a feature quantity function to be generated is a second or later generation (S121). That is, the feature quantity function generation section 103 determines whether or not to generate a first feature quantity function for an input of learning data. If the feature quantity function is not the second or later generation (if the first feature quantity function is generated), the feature quantity function generation section 103 moves the processing to step S122. On the other hand, if the feature quantity function is the second or later generation, the feature quantity function generation section 103 moves the processing to step S123.

If the processing moves to step S122, the feature quantity function generation section 103 generates a predetermined number of feature quantity functions (hereinafter, a feature quantity function list) by randomly combining fundamental functions (S122). On the other hand, if the processing moves to step S123, the feature quantity function generation section 103 updates a feature quantity function list using the evolutionary technique (S123).

(Details of Step S122: Random Generation of Feature Quantity Function)

Here, the processing of step S122 (see FIG. 11) will be described in more detail with reference to FIG. 12.

Figure 12:
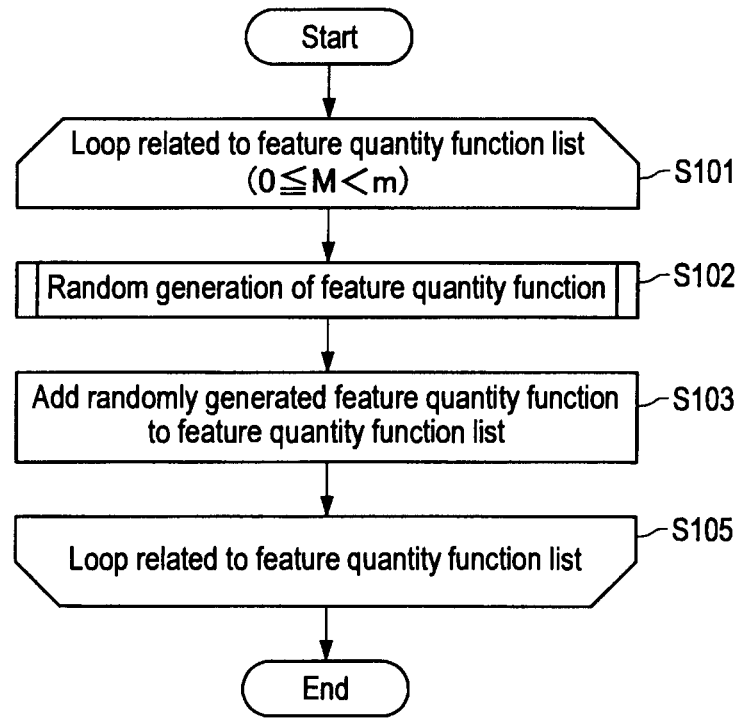
FIG. 12 is an illustrative diagram illustrating the method of generating a feature quantity function (random generation) according to the same embodiment.

As shown in FIG. 12, the feature quantity function generation section 103 first starts a processing loop (M=0 to m loops) related to the feature quantity function list (S131). In this regard, m is the number of feature quantity functions included in the feature quantity function list. If the processing loop is started, the feature quantity function generation section 103 generates a feature quantity function by randomly combining the fundamental functions (S132). Then, the feature quantity function generation section 103 adds the randomly generated feature quantity function to the feature quantity function list (S133). Then, the feature quantity function generation section 103 increments M by 1 (S134), and re-executes the processing of steps S132 and S133. In this regard, if the processing of steps S132 and S133 for M=m-1 has been completed, the feature quantity function generation section 103 terminates a series of processing related to step S122.

(Details of Step S132)

Next, the processing of step S132 (see FIG. 12) will be described in more detail with reference to FIG. 13.

Figure 13:
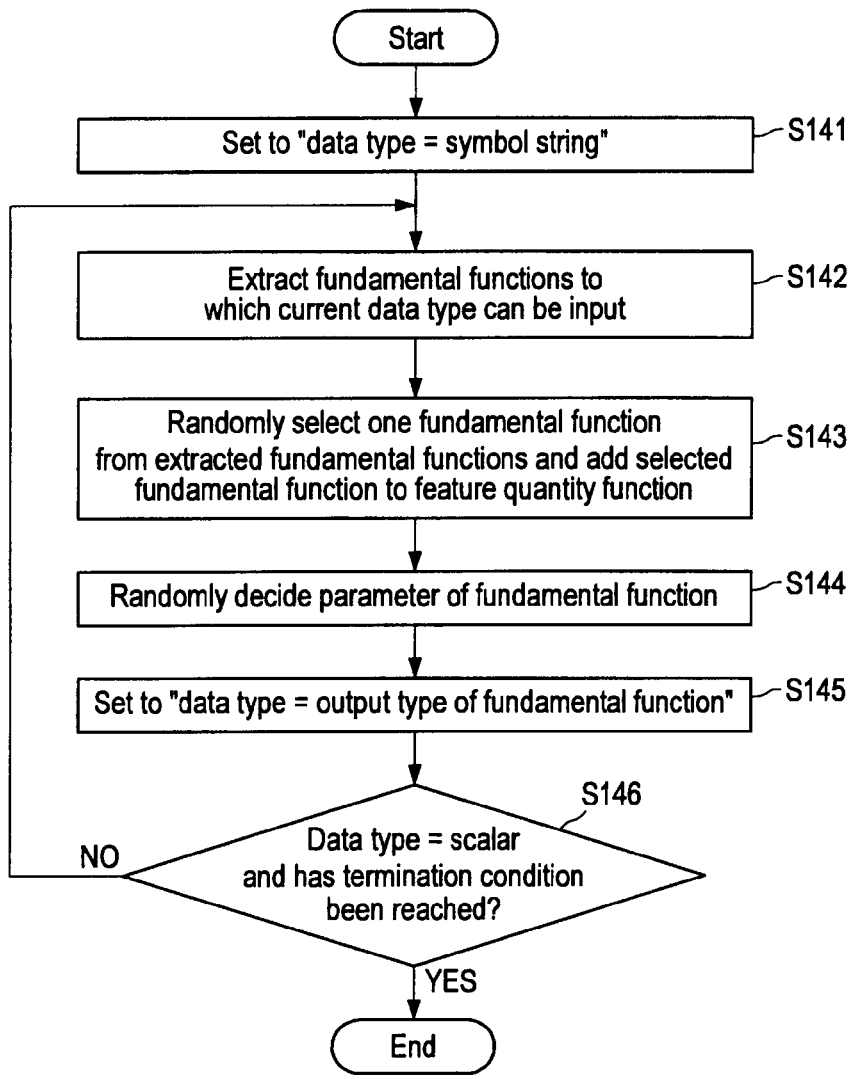
FIG. 13 is an illustrative diagram illustrating the method of generating a feature quantity function (random generation) according to the same embodiment.

As shown in FIG. 13, the feature quantity function generation section 103 first sets a current data type (a symbol string, a vector, a scalar, or the like) to the "symbol string" (S141). Then, the feature quantity function generation section 103 extracts fundamental functions in which a type of data set to the current data type can be input from among a plurality of already prepared fundamental functions (S142). For example, if the current data type is the "symbol string," the fundamental functions Cut, Find, and the like are extracted. Then, the feature quantity function generation section 103 randomly selects one fundamental function from the fundamental functions extracted in step S142, and adds the selected fundamental function to the feature quantity function (S143).

Then, the feature quantity function generation section 103 randomly decides a parameter of the fundamental function (S144). Then, the feature quantity function generation section 103 sets an output type of the fundamental function added to the feature quantity function to the current data type (S145). For example, if the fundamental function added to the feature quantity function is Find, the output type "vector" of Find is set to the current data type. Then, the feature quantity function generation section 103 determines whether or not the current data type is the "scalar," and whether or not a predetermined termination condition has been reached (S146).

For example, a condition that it is terminated if a randomly decided number of fundamental functions have been added to the feature quantity function or a condition that it is terminated if a random number generated in step S146 is equal to or less than a predetermined value is considered the predetermined termination condition. If the current data type is not the "scalar" or the predetermined termination condition has not been reached, the feature quantity function generation section 103 re-moves the processing to step S142. On the other hand, if the current data type is the "scalar" and the predetermined termination condition has been reached, the feature quantity function generation section 103 terminates a series of processing related to step S132.

(Details of Step S123: Feature Quantity Function Generation by Evolutionary Technique)

Next, the processing of step S123 (see FIG. 11) will be described in more details with reference to FIG. 14.

Figure 14:
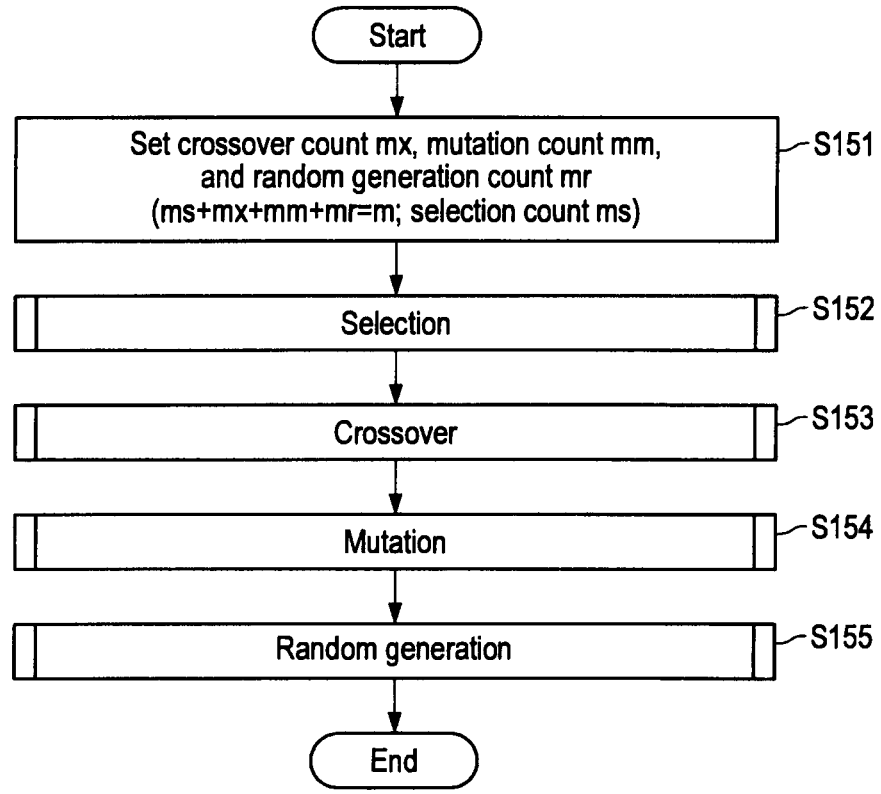
FIG. 14 is an illustrative diagram illustrating the method of generating a feature quantity function (evolutionary generation) according to the same embodiment.

As shown in FIG. 14, the feature quantity function generation section 103 first decides a crossover count mx, a mutation count mm, and a random generation count mr (S151). In this regard, if the number of feature quantity functions remaining in a next generation among previous-generation feature quantity functions is ms, mx, mm, and mr are decided so that ms+mx+mm+mr=m is satisfied.

Then, the feature quantity function generation section 103 selects ms feature quantity functions to remain from the previous-generation feature quantity functions (S152). Then, the feature quantity function generation section 103 selects two feature quantity functions from among the feature quantity functions selected in step S152, and generates a new feature quantity function by crossing the two feature quantity functions (S153). Then, the feature quantity function generation section 103 generates a new feature quantity function by mutating the feature quantity function selected in step S152 (S154). Then, the feature quantity function generation section 103 randomly generates a new feature quantity function by randomly combining the fundamental functions (S155).

Hereinafter, the respective processing steps of the selection (S152), the crossover (S153), the mutation (S154), and the random generation (S155) will be described in more detail.

(Details of Step S152: Selection)

Figure 15:
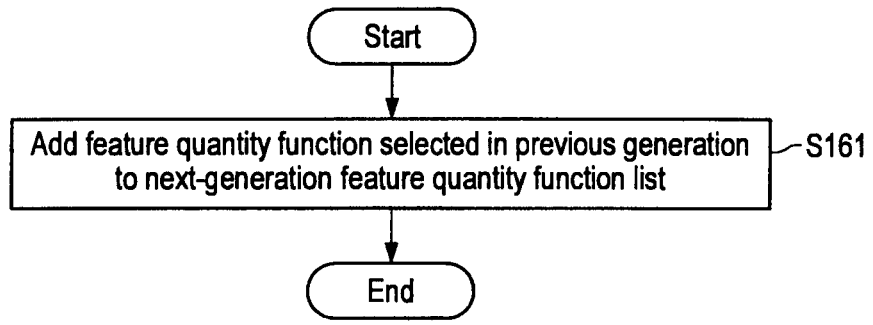
FIG. 15 is an illustrative diagram illustrating the method of generating a feature quantity function (evolutionary generation; selection) according to the same embodiment.

First, the processing of step S152 (see FIG. 14) will be described in more detail with reference to FIG. 15. As shown in FIG. 15, the feature quantity function generation section 103 selects an effective feature quantity function from a previous-generation feature quantity function list and adds the effective feature quantity function to a next-generation feature quantity function list (S161). The effective feature quantity function is decided on the basis of information of an effective feature quantity obtained when a previous-generation estimation function is generated.

(Details of Step S153: Crossover)

Next, the processing of step S153 (see FIG. 14) will be described in more detail with reference to FIG. 16.

Figure 16:
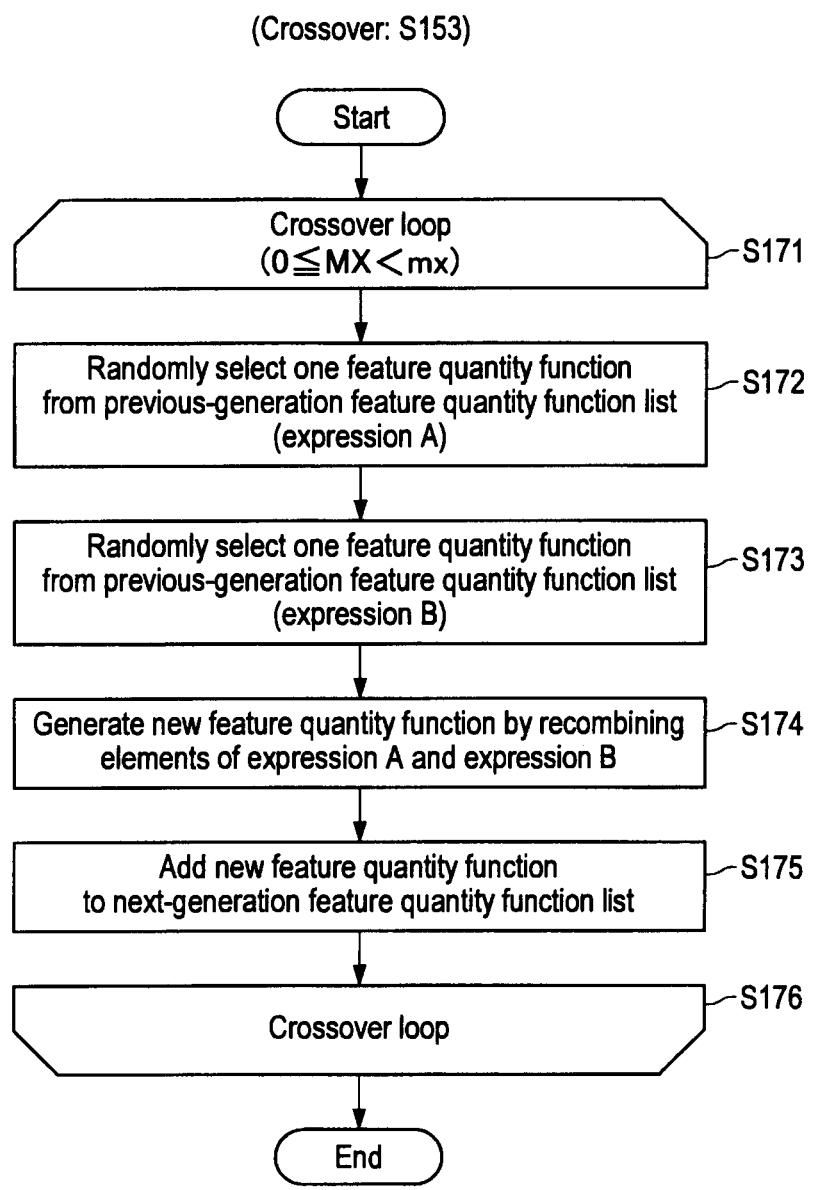
FIG. 16 is an illustrative diagram illustrating the method of generating a feature quantity function (evolutionary generation; crossover) according to the same embodiment.

As shown in FIG. 16, first, the feature quantity function generation section 103 starts a processing loop related to an index MX (MX=0 to mx-1) (S171). Then, the feature quantity function generation section 103 randomly selects one feature quantity function from the previous-generation feature quantity functions selected in step S152 (S172). The feature quantity function selected in step S172 is expressed as (Expression A). Then, the feature quantity function generation section 103 randomly selects one feature quantity function different from (Expression A) from the previous-generation feature quantity functions selected in step S152 (S173). The feature quantity function selected in step S173 is expressed as (Expression B).

Then, the feature quantity function generation section 103 generates a new feature quantity function by recombining some elements of (Expression A) and (Expression B) (S174). Then, the feature quantity function generation section 103 adds the new feature quantity function generated in step S174 to the next-generation feature quantity function list (S175). Then, the feature quantity function generation section 103 returns the processing to step S172 by incrementing the index MX by 1 (S176). In this regard, if the processing of steps S172 to S175 for the index MX=0 to mx-1 has been completed, the feature quantity function generation section 103 terminates a series of processing related to the crossover.

(Details of Step S154: Mutation)

Next, the processing of step S154 (see FIG. 14) will be described in more detail with reference to FIG. 17.

Figure 17:
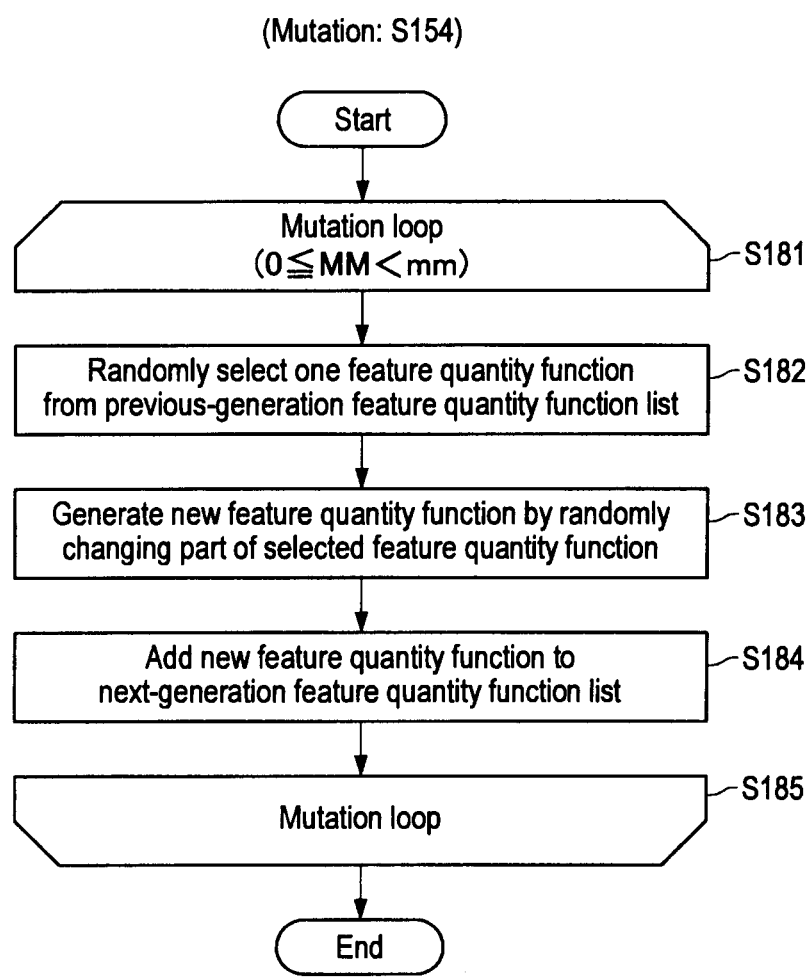
FIG. 17 is an illustrative diagram illustrating the method of generating a feature quantity function (evolutionary generation; mutation) according to the same embodiment.

As shown in FIG. 17, the feature quantity function generation section 103 first starts a processing loop related to an index MM (MM=0 to mm-1) (S181). Then, the feature quantity function generation section 103 randomly selects one feature quantity function from the previous-generation feature quantity functions selected in step S152 (S182). Then, the feature quantity function generation section 103 generates a new feature quantity function by randomly changing some elements of the feature quantity function selected in step S182 (S183). Then, the feature quantity function generation section 103 adds the new feature quantity function generated in step S183 to the next-generation feature quantity function list (S184). Then, the feature quantity function generation section 103 returns the processing to step S182 by incrementing the index MM by 1 (S185). In this regard, if the processing of steps S182 to S184 for the index MM=0 to mm−1 has been completed, the feature quantity function generation section 103 terminates a series of processing related to the mutation.

(Details of Step S155: Random Generation)

Next, the processing of step S155 (see FIG. 14) will be described in more detail with reference to FIG. 18.

Figure 18:
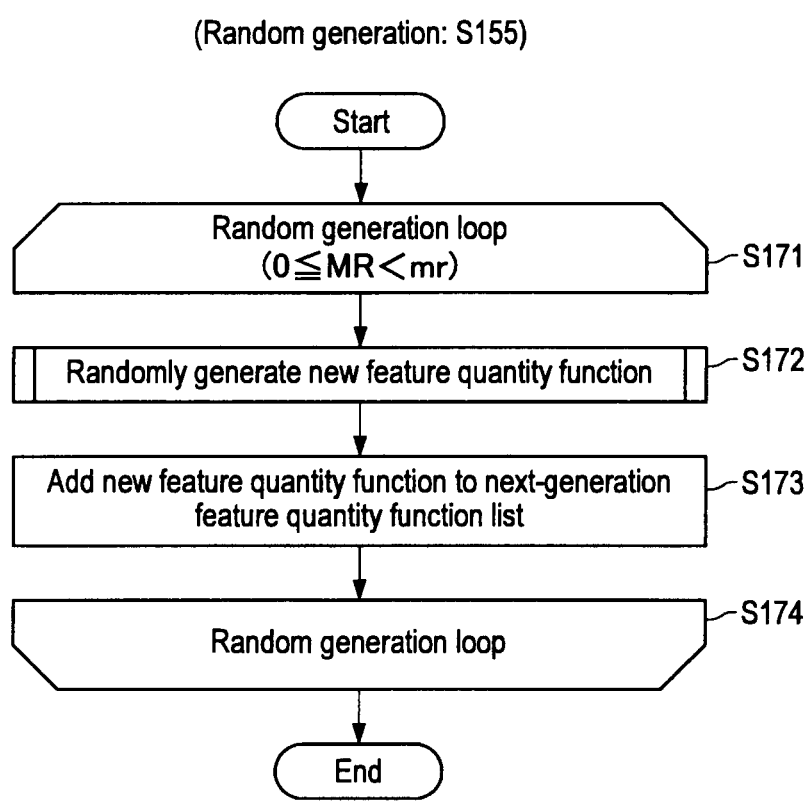
FIG. 18 is an illustrative diagram illustrating the method of generating a feature quantity function (evolutionary generation; random generation) according to the same embodiment.

As shown in FIG. 18, the feature quantity function generation section 103 firsts starts a processing loop related to an index MR (MR=0 to mr-1) (S191). Then, the feature quantity function generation section 103 generates a new feature quantity function by randomly combining fundamental functions (S192). The processing of step S192 is substantially the same as the processing of step S132 shown in FIG. 13. Then, the feature quantity function generation section 103 adds the new feature quantity function generated in step S192 to the next-generation feature quantity function list (S193). Then, the feature quantity function generation section 103 returns the processing to step S192 by incrementing the index MR by 1 (S194). In this regard, if the processing of steps S192 and S193 for the index MR=0 to mr-1 has been completed, the feature quantity function generation section 103 terminates a series of processing related to the random generation.

The processing flow related to the feature quantity function generation has been described above. As described above, a first-generation feature quantity function list is randomly generated and a second- or later-generation feature quantity function list is generated by the evolutionary technique.

(1-3-4: Calculation of Feature Quantity Function)

Figure 19:
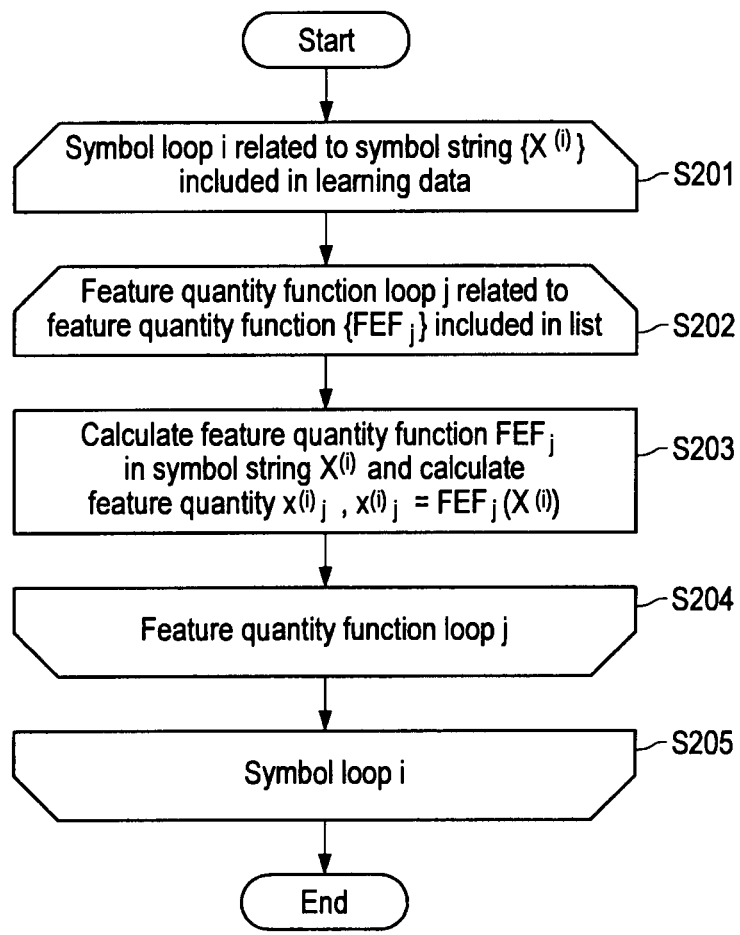
FIG. 19 is an illustrative diagram illustrating a method of calculating a feature quantity function according to the same embodiment.

Next, a flow of processing related to the feature quantity function calculation will be described in more detail with reference to FIG. 19. FIG. 19 is an illustrative diagram illustrating the flow of processing related to the feature quantity function calculation in more detail. The processing related to the feature quantity function calculation is mainly executed by the feature quantity calculation section 105.

As shown in FIG. 19, the feature quantity calculation section 105 first starts a processing loop (symbol string loop) related to a symbol string $\{X^{(i)}\}$ included in learning data (S201). For example, if q symbol strings $X^{(1)}, \ldots X^{(q)}$ are included in the learning data, the feature quantity calculation section 105 executes processing within the symbol string loop for an index i=1 to q. Then, the feature quantity calculation section 105 starts a processing loop (feature quantity function loop) related to a feature quantity function $\{FEF_j\}$ included in the feature quantity function list (S202). For example, if feature quantity functions $FEF_1, \ldots FEF_m$ are included in the feature quantity function list, the feature quantity calculation section 105 executes processing within the feature quantity function loop for an index j=1 to m.

Then, the feature quantity calculation section 105 calculates the feature quantity function $FEF_j$ for the symbol string $X^{(j)}$), and calculates a feature quantity $x^{(i)}_j = FEF_j(X^{(i)})$ (S203). Then, the feature quantity calculation section 105 re-executes the processing of step S203 by incrementing the index j by 1 (S204). In this regard, after step S203 is executed for j=m, the feature quantity calculation section 105 moves the processing to step S205 by initializing the index j to 1.

If the processing moves to step S205, the feature quantity calculation section 105 increments the index i by 1, and re-executes a feature quantity function loop of steps S202 to S204 (S205). In this regard, if the processing of steps S202 to S204 has been completed for the index i=1 to q, the feature quantity calculation section 105 terminates a series of processing related to the feature quantity calculation.

The flow of processing related to the feature quantity calculation has been described above.

(1-3-5: Generation of Estimation Function)

Figure 20:
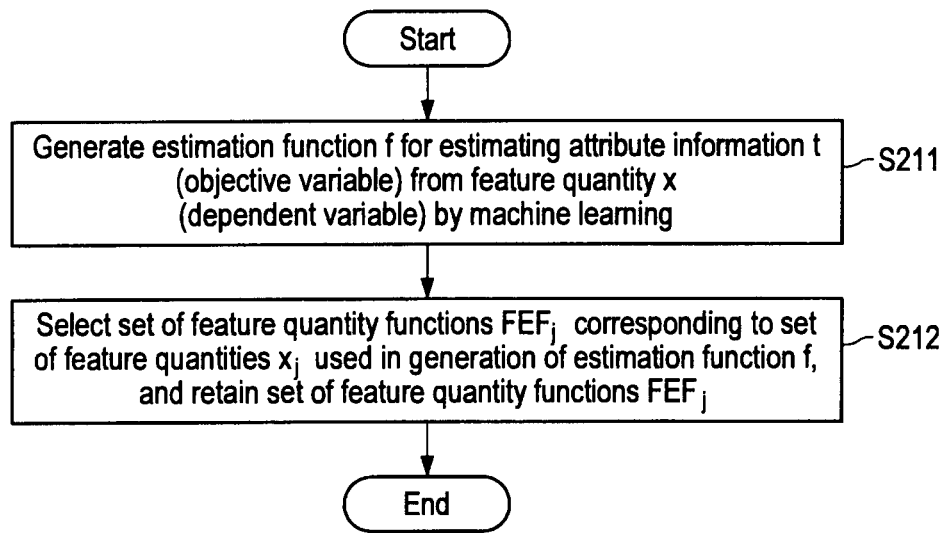
FIG. 20 is an illustrative diagram illustrating a method of calculating an estimation function according to the same embodiment.

Next, a flow of processing related to the estimation function generation will be described in more detail with reference to FIG. 20. FIG. 20 is an illustrative diagram illustrating the flow of processing related to the estimation function generation in more detail. The processing related to the estimation function generation is mainly executed by the estimation function generation section 106.

As shown in FIG. 20, the estimation function generation section 106 generates an estimation function f for estimating attribute information from a feature quantity using machine learning by the function of the machine learning section 1061 (S211). Then, the estimation function generation section 106 selects a set of feature quantities used for the estimation function generation by the function of the effective feature quantity selection section 1062, and input information regarding the selected feature quantity set (information of effective feature quantities) to the feature quantity function generation section 103 (S212). If the information of the effective feature quantities is input, the feature quantity function generation section 103 selects a set of feature quantity functions corresponding to an input set of effective feature quantities, and stores its information (S212). The effective feature quantity selection section 1062 may execute processing related to the selection and storage of the feature quantity functions corresponding to the set of effective feature quantities.

The flow of processing related to the estimation function generation has been described above.

[1-4: Functional Configuration of Information Processing Device 200 (Estimation Device)]

Next, the functional configuration of the information processing device 200 (the estimation device) according to this embodiment will be described with reference to FIG. 21. FIG. 21 is an illustrative diagram illustrating the functional configuration of the information processing device 200 (the estimation device) according to this embodiment. The information processing device 200 is the estimation device that estimates attribute information indicating a feature of a symbol string from any symbol string using a feature quantity function and an estimation function generated by the information processing device 100 described above.

Figure 21:
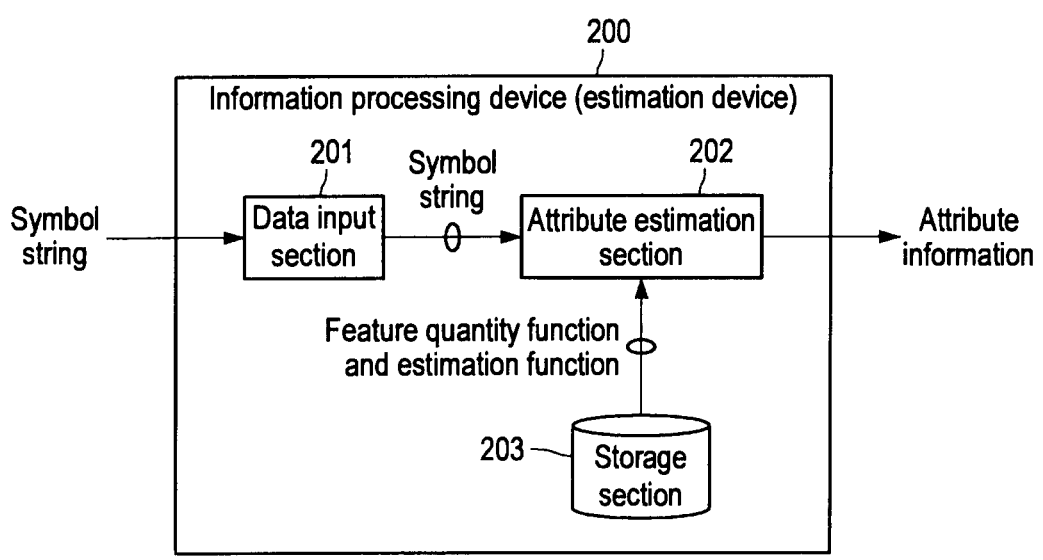
FIG. 21 is an illustrative diagram illustrating a functional configuration of an information processing device (estimation device) according to the same embodiment.

As shown in FIG. 21, the information processing device 200 is mainly constituted by a data input section 201, an attribute estimation section 202, and a storage section 203.

First, a symbol string is input to the data input section 201. Here, the input symbol string is any symbol string, which is not given as learning data. The symbol string input to the data input section 201 is input to the attribute estimation section 202. If the symbol string is input, the attribute estimation section 202 acquires a feature quantity function and an estimation function pre-stored in the storage section 203. Then, the attribute estimation section 202 calculates a feature quantity by inputting the symbol string to the acquired feature quantity function. Further, the attribute estimation section 202 calculates attribute information by inputting the calculated feature quantity to an estimation function, and outputs the calculated attribute information.

The functional configuration of the information processing device 200 has been described above. The information processing devices 100 and 200 have been separately expressed above, but may be integrated.

[1-5: Method of Estimating Attribute Information]

Figure 22:
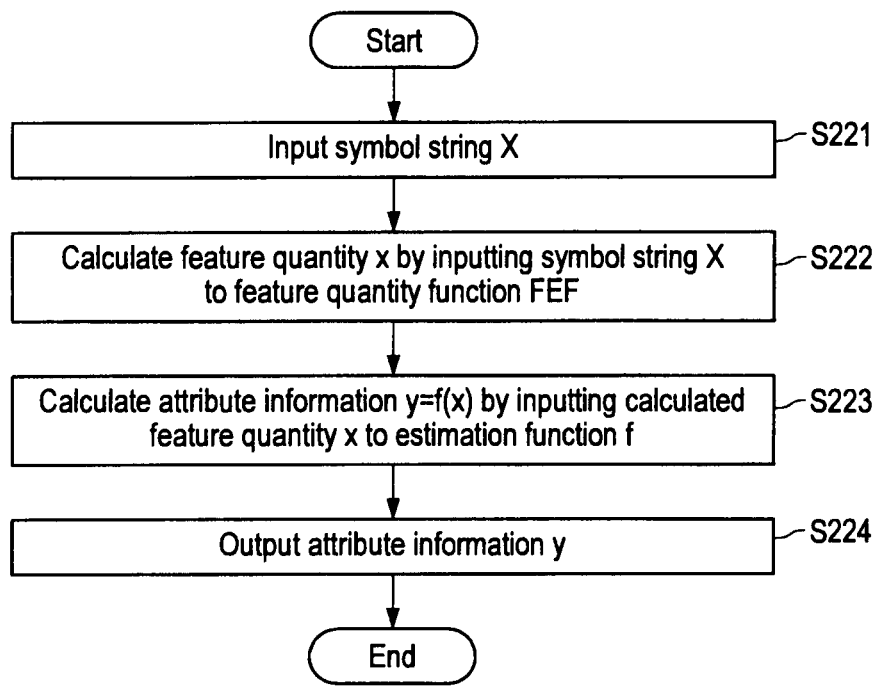
FIG. 22 is an illustrative diagram illustrating a method of estimating attribution information according to the same embodiment.

Next, a flow of processing related to the method of estimating attribute information according to this embodiment will be described with reference to FIG. 22. FIG. 22 is an illustrative diagram illustrating the method of estimating attribution information according to this embodiment. The method of estimating attribution information according to this embodiment is implemented by the function of the information processing device 200.

As shown in FIG. 22, first, a symbol string X is input to the information processing device 200 (S221). Then, the information processing device 200 calculates a feature quantity x by inputting the input symbol string X to a feature quantity function FEF by the function of the attribute estimation section 202 (S222). Then, the information processing device 200 calculates attribute information y=f(x) by inputting the calculated feature quantity x to the estimation function f by the function of the attribute estimation section 202 (S223). Then, the information processing device 200 outputs the calculated attribute information y (S224).

The flow of processing related to the method of estimating attribute information according to this embodiment has been described above.

[1-6: Hardware Configuration]

Figure 23:
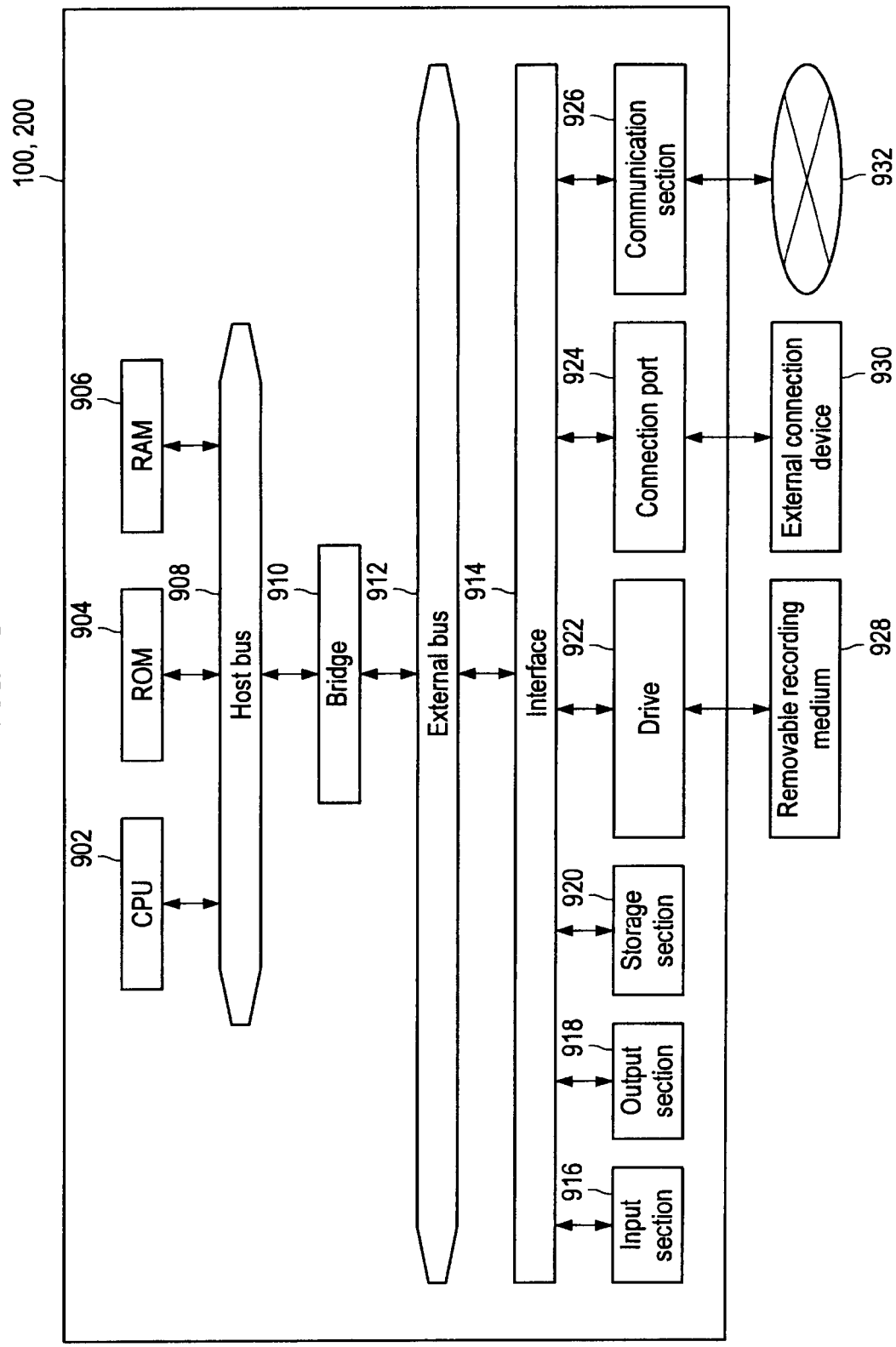
FIG. 23 is an illustrative diagram illustrating hardware configurations of the information processing devices (learning device and estimation device).

The function of each structural element of the information processing device 100 and 200 described above can be realized by using, for example, the hardware configuration shown in FIG. 23. That is, the function of each structural element can be realized by controlling the hardware shown in FIG. 23 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 23, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

2: Summary

Finally, technical content according to the embodiment of the present disclosure will be briefly summarized. Here, the described technical content can be applied to various information processing devices, for example, such as a PC, a mobile phone, a mobile game machine, a mobile information terminal, an information appliance, and a car navigation system.

The functional configuration of the above-described information processing device can be expressed as follows. The information processing device has an input section, a feature quantity function generation section, a feature quantity calculation section, an estimation function generation section, and an output section as follows. The above-described input section is an input means for inputting a plurality of symbol strings and attribute information desired to be extracted from each symbol string. The attribute information is information indicating features of the respective symbol strings. The above-described feature quantity function generation section is means for selecting a plurality of functions from a predetermined function group including a function for converting a symbol string into a numerical value and generating a plurality of feature quantity functions for outputting a feature quantity from the symbol string by combining the plurality of functions.

The above-described feature quantity calculation section is means for inputting each symbol string input by the input section to each feature quantity function generated by the feature quantity function generation section and calculating a feature quantity corresponding to each symbol string. The above-described estimation function generation section is means for executing machine learning using attribute information corresponding to each symbol string input by the input section and a feature quantity corresponding to each symbol string calculated by the feature quantity calculation section, and generating an estimation function for estimating the attribute information from the feature quantity. The above-described output section is means for outputting the feature quantity functions generated by the feature quantity function generation section and the estimation function generated by the estimation function generation section.

As described above, the information processing device according to this embodiment generates a feature quantity function for converting a symbol string into a feature quantity and an estimation function for estimating attribute information from the feature quantity. At this time, the estimation function for estimating the attribute information from the symbol string is not obtained by machine learning, but the estimation function for converting the symbol string into the feature quantity and estimating the attribute information from the feature quantity is obtained by machine learning. As described above, a process of obtaining a feature quantity from a symbol string is included, so that an estimation function capable of estimating attribute information from any symbol string can be obtained. Estimation accuracy by the estimation function can be improved.

REFERENCE

The above-described data input section 101 is an example of an input section. The above-described feature quantity function generation section 103 is an example of a generation alternation section.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-159598 filed in the Japan Patent Office on Jul. 14, 2010, the entire content of which is hereby incorporated by reference.

What is claimed is:

1. An information processing device comprising:
a processor; and
a storage medium coupled to the processor and storing a program that, when executed by the processor, causes the device to implement:
an input section configured to input a plurality of symbol strings and attribute information desired to be extracted from each symbol string;
a feature quantity function generation section configured to randomly select a plurality of functions from a predetermined function group including a function for converting a symbol string into a numerical value, and generate a plurality of feature quantity functions for outputting a feature quantity from the symbol string by combining the plurality of functions;
a feature quantity calculation section configured to input each symbol string input by the input section to each feature quantity function generated by the feature quantity function generation section and to calculate a feature quantity corresponding to each symbol string;
an estimation function generation section configured to execute machine learning using the attribute information corresponding to each symbol string input by the input section and the feature quantity corresponding to each symbol string calculated by the feature quantity calculation section, and generate an estimation function for estimating the attribute information from the feature quantity; and
an output section configured to output the feature quantity functions generated by the feature quantity function generation section and the estimation function generated by the estimation function generation section.

2. The information processing device according to claim 1, wherein the symbol string is a character string.

3. The information processing device according to claim 2, wherein the estimation function generation section includes:
an effective feature quantity selection section configured to select a feature quantity effective to estimate the attribute information; and
a machine learning section configured to execute machine learning using the effective feature quantity selected by the effective feature quantity selection section and attribute information corresponding to the effective feature quantity, and generate an estimation function for estimating the attribute information from the effective feature quantity.

4. The information processing device according to claim 3, wherein the program, when executed by the processor, causes the device to implement:
a generation alternation section configured to generate a next-generation feature quantity function by assuming the feature quantity function to be an entity and executing entity selection, inter-entity crossover, and entity mutation;
wherein, if the next-generation feature quantity function has been generated by the generation alternation section, the feature quantity calculation section calculates a feature quantity using the next-generation feature quantity function, and the estimation function generation section generates an estimation function using the feature quantity calculated using the next-generation feature quantity function by the feature quantity calculation section, and
the generation of the next-generation feature quantity function by the generation alternation section, the calculation of the feature quantity by the feature quantity calculation section, and the generation of the estimation function by the estimation function generation section are iteratively executed.

5. The information processing device according to claim 4, wherein the program, when executed by the processor, causes the device to implement:
an N-gram analysis section configured to execute N-gram analysis for a symbol string input by the input section, and measure appearance frequencies of N-grams appearing in the symbol string,
wherein the feature quantity function generation section generates the feature quantity function using the N-grams obtained by the analysis by the N-gram analysis section and the N-gram appearance frequencies.

6. An information processing method comprising:
inputting a plurality of symbol strings and attribute information desired to be extracted from each symbol string;

randomly selecting a plurality of functions from a predetermined function group including a function for converting a symbol string into a numerical value, and generating a plurality of feature quantity functions for outputting a feature quantity from the symbol string by combining the plurality of functions;

inputting each symbol string to each feature quantity function, and calculating a feature quantity corresponding to each symbol string;

executing machine learning using the attribute information corresponding to each symbol string and the feature quantity corresponding to each symbol string, and generating an estimation function for estimating the attribute information from the feature quantity; and outputting the feature quantity functions and the estimation function.

7. A non-transitory, computer-readable storage medium storing a program which, when executed by a processor, causes a computer to implement:

an input function of inputting a plurality of symbol strings and attribute information desired to be extracted from each symbol string;

a feature quantity function generation function of randomly selecting a plurality of functions from a predetermined function group including a function for converting a symbol string into a numerical value, and generating a plurality of feature quantity functions for outputting a feature quantity from the symbol string by combining the plurality of functions;

a feature quantity calculation function of inputting each symbol string input by the input function to each feature quantity function generated by the feature quantity function generation function, and calculating a feature quantity corresponding to each symbol string;

an estimation function generation function of executing machine learning using the attribute information corresponding to each symbol string input by the input function and the feature quantity corresponding to each symbol string calculated by the feature quantity calculation function, and generating an estimation function for estimating the attribute information from the feature quantity; and an output function of outputting the feature quantity functions generated by the feature quantity function generation function and the estimation function generated by the estimation function generation function.

* * * * *